US009809075B2

(12) United States Patent
Bounds

(10) Patent No.: US 9,809,075 B2
(45) Date of Patent: Nov. 7, 2017

(54) GAS SPRING AND GAS DAMPER ASSEMBLY AND METHOD

(71) Applicant: Firestone Industrial Products Company, LLC, Indianapolis, IN (US)

(72) Inventor: Joseph A. Bounds, Fishers, IN (US)

(73) Assignee: Firestone Industrial Products Company, LLC, Nashville, TN (US)

(*) Notice: Subject to any disclaimer, the term of this patent is extended or adjusted under 35 U.S.C. 154(b) by 0 days.

(21) Appl. No.: 15/055,038

(22) Filed: Feb. 26, 2016

(65) Prior Publication Data
US 2016/0176258 A1   Jun. 23, 2016

Related U.S. Application Data

(63) Continuation of application No. 14/350,046, filed as application No. PCT/US2012/059146 on Oct. 5, 2012, now Pat. No. 9,290,073.
(Continued)

(51) Int. Cl.
*B60G 15/12* (2006.01)
*B60G 15/14* (2006.01)
(Continued)

(52) U.S. Cl.
CPC ............ *B60G 15/12* (2013.01); *B60G 15/14* (2013.01); *B60G 17/0521* (2013.01);
(Continued)

(58) Field of Classification Search
CPC ........ B60G 15/12; B60G 15/14; B60G 11/17; B60G 17/0521; B60G 2202/32;
(Continued)

(56) References Cited

U.S. PATENT DOCUMENTS 3,897,941 A   8/1975   Hirtreiter
6,474,630 B1   11/2002   Weitzenhof
(Continued)

FOREIGN PATENT DOCUMENTS

EP   0000287   1/1979
EP   0516129   12/1992
(Continued)

OTHER PUBLICATIONS

International Search Report and Written Opinion for corresponding patent application No. PCT/US2012/059146 dated Mar. 6, 2013.

*Primary Examiner* — Christopher Schwartz
(74) *Attorney, Agent, or Firm* — Brian D. McAlhaney; Fay Sharpe LLP

(57) ABSTRACT

A gas spring and gas damper assembly includes a gas spring assembly and a gas damper assembly. The gas spring assembly includes a first wall portion, a second wall portion disposed in spaced relation to the first wall portion, and a flexible wall section connected therebetween. The gas damper assembly includes a third wall portion disposed in longitudinally-spaced relation to the first wall portion, and a second flexible wall section connected between the second wall portion and the third wall portion. A fourth wall portion is disposed between the first and second wall sections to define two pressurized gas chambers. A damper rod connects at least the first and third wall portions. Methods are also included.

12 Claims, 18 Drawing Sheets

Related U.S. Application Data

(60) Provisional application No. 61/543,632, filed on Oct. 5, 2011, provisional application No. 61/613,486, filed on Mar. 20, 2012.

(51) Int. Cl.
   *B60G 17/052* (2006.01)
   *F16F 9/04* (2006.01)

(52) U.S. Cl.
   CPC ............ *F16F 9/049* (2013.01); *F16F 9/0454* (2013.01); *B60G 2202/242* (2013.01); *B60G 2202/314* (2013.01); *B60G 2202/32* (2013.01); *B60G 2204/1262* (2013.01); *B60G 2206/00* (2013.01); *B60G 2206/40* (2013.01); *B60G 2206/80* (2013.01); *F16F 2226/04* (2013.01); *Y10T 29/49609* (2015.01)

(58) Field of Classification Search
   CPC ........... B60G 2206/41; B60G 2206/424; F16F 9/0472; F16F 2226/04
   USPC .......................................... 267/64.19–64.28
   See application file for complete search history.

(56) References Cited

U.S. PATENT DOCUMENTS

| | | | |
|---|---|---|---|
| 6,871,845 B2* | 3/2005 | Beck | F16F 9/08 267/64.17 |
| 9,290,073 B2* | 3/2016 | Bounds | B60G 15/14 |
| 2005/0023093 A1* | 2/2005 | Leiphart | B60G 17/08 188/283 |
| 2010/0065994 A1 | 3/2010 | Krauss | |
| 2011/0115140 A1 | 5/2011 | Moulik | |

FOREIGN PATENT DOCUMENTS

| | | |
|---|---|---|
| EP | 1429045 | 6/2004 |
| EP | 1715214 | 10/2006 |
| EP | 2281702 | 2/2011 |
| WO | WO-2010/006167 | 1/2010 |

\* cited by examiner

GAS SPRING AND GAS DAMPER ASSEMBLY AND METHOD

This application is a continuation of U.S. Patent application No. 14/350,046 filed on Apr. 4, 2014, which was the National Stage of International Application No. PCT/US2012/059146, filed on Oct. 5, 2012, which claims the benefit of priority from U.S. Provisional Patent Application No. 61/543,632, filed on Oct. 5, 2011, and U.S. Provisional Patent Application No. 61/613,486, filed on Mar. 20, 2012, all of which are hereby incorporated herein by reference in their entirety.

BACKGROUND

The present disclosure broadly relates to the art of spring devices and, more particularly, to a gas spring and gas damper assembly as well as a vehicle suspension system and a method of operating such a gas spring and gas damper assembly.

A suspension system, such as may be used in connection with motorized vehicles, for example, can include one or more spring elements for accommodating forces and loads associated with the operation and use of the corresponding device (e.g., a motorized vehicle) to which the suspension system is operatively connected. In such applications, it is often considered desirable to utilize spring elements that operate at a lower spring rate, as a reduced spring rate can favorably influence certain performance characteristics, such as vehicle ride quality and comfort, for example. That is, it is well understood in the art that the use of a spring element having a higher spring rate (i.e. a stiffer spring) will transmit a greater magnitude of inputs (e.g., road inputs) to the sprung mass and that, in some applications, this could undesirably affect the sprung mass, such as, for example, by resulting in a rougher, less-comfortable ride of a vehicle. Whereas, the use of spring elements having lower spring rates (i.e., a softer or more-compliant spring) will transmit a lesser amount of the inputs to the sprung mass.

Such suspension systems also commonly include one or more dampers or damping components that are operative to dissipate energy associated with undesired inputs and movements of the sprung mass, such as road inputs occurring under dynamic operation of a vehicle, for example. Typically, such dampers are liquid filled and operatively connected between a sprung and unsprung mass, such as between a body and axle of a vehicle, for example. One example of such damping components are conventional shock absorbers that are commonly used in vehicle suspension systems.

In other arrangements, however, the dampers or damping components can be of a type and kind that utilizes gas rather than liquid as the working medium. In such known constructions, the gas damper portion permits gas flow between two or more volumes of pressurized gas, such as through one or more orifices, as shown, for example, in U.S. Patent Application Publication No. 2004/0124571, or through one or more valve ports, as shown, for example, in U.S. Patent Application Publication No. 2003/0173723. Generally, there is some resistance to the movement of pressurized gas through these passages or ports, and this resistance acts to dissipate energy associated with the gas spring portion and thereby provide some measure of damping.

One factor that may be limiting the broader adoption and use of gas spring and gas damper assemblies relates to the significant travel of which gas spring devices are capable. That is, gas spring devices are capable of being displaced between a minimum or compressed height and a maximum or extended height and the difference in these overall heights can be substantial.

Certain difficulties relating to the incorporation of gas dampers into gas spring devices have been associated with the aforementioned differences in overall height of gas spring devices. At one extreme, the minimum or compressed height of a gas spring device will act to limit the overall length of components that can be housed within the gas spring device. At the other extreme, any components housed within the gas spring device should remain operatively connected between the opposing end members of the gas spring device in the extended condition thereof.

Accordingly, it is believed desirable to develop a gas spring and gas damper assembly as well as a suspension system and method of assembly that further contribute to the art and, potentially, overcome one or more of the foregoing (e.g., issues relating to the achievement of targeted spring rates, the achievement of targeted of damping performance and/or the achievement of targeted travel capabilities) and/or other difficulties associated with known constructions (e.g., issues relating to cost of manufacture, process of assembly and/or robustness of design).

BRIEF DESCRIPTION

One example of a gas spring and gas damper assembly in accordance with the subject matter of the present disclosure can include a gas spring assembly and a gas damper assembly. The gas spring assembly can include a first end member and a second end member that includes an open end and is disposed in longitudinally-spaced relation to the first end member such that a longitudinal axis is formed therebetween. A first flexible wall section extending circumferentially about the axis and is operatively connected between the first and second ends members such that a first rolling lobe is formed along the second end member and at least partially defines a first spring chamber. The gas damper includes a third end member disposed in longitudinally-spaced relation to the first end member of the gas spring assembly. A second flexible wall section extends circumferentially about the axis and is operatively connected between the second end member and the third end member such that a second rolling lobe is formed along the third end member and at least partially defines a second spring chamber. The fourth end member includes opposing first and second sides. The fourth end member also includes first and second passages extending therethrough between the first and second sides. The fourth and member extends across the open end of the second end member and is operatively secured along the second end member such that the first side of the fourth end member is in fluid communication with the first spring chamber and the second side is in fluid communication with the second spring chamber. A damper rod extends through the first passage of the fourth end member and operatively connects the third end member to the first end member. The gas spring and gas damper assembly is capable of undergoing extension and compression actions. During an extension action, pressurized gas is transferred through at least the second passage of the fourth end member from the second spring chamber into said first spring chamber. During a compression action, pressurized gas is transferred through at least the second passage of the fourth end member from the first spring chamber into the second spring chamber.

One example of a method of assembling a gas spring and gas damper assembly in accordance with the subject matter of the present disclosure can include providing a rod assembly that includes a longitudinal axis, an elongated rod, an end nut and a sealing element. The method can also include providing an inner piston element having a passage extending therethrough, and extending the elongated rod through the passage such that the end nut and the sealing element engage the inner piston element in a first position in which the end nut remains rotatably displaceable relative to the inner piston element and in which a substantially fluid-tight seal is formed between the sealing element and the inner piston element. The method can further include providing a flexible wall and securing the flexible wall to the inner piston element to at least partially form a spring chamber. The method can also include providing a first pivot mount operatively connected to the elongated rod and a second pivot mount supported in spaced relation to the first pivot mount. The method can further include orienting the first and second pivot mounts relative to one another by rotating at least the first pivot mount, the elongated rod and the end nut relative to the inner piston element such that the pivot mounts are in approximate alignment with one another. The method can also include transferring pressurized gas into the spring chamber, and thereby urging the inner piston element in an axially-outward direction and into a second position in which the end nut and the inner piston element are rotatably fixed relative to one another.

Another example of a method of assembling a gas spring and gas damper assembly in accordance with the subject matter of the present disclosure can include providing a rod assembly including a longitudinal axis, an elongated rod having opposing first and second ends, and end nut disposed along the first end and a sealing element disposed along the elongated rod between the first and second ends. The method can also include providing an inner piston element having a passage extending therethrough. The method can further include extending the elongated rod through the passage, and engaging the end nut and the sealing element with the inner piston element in a first position such that the end nut remains rotatably displaceable relative to the inner piston element and such that a substantially fluid-tight seal is formed between the sealing element and the inner piston element. The method can also include providing a first flexible wall section having a first end, and securing the first end of the first flexible wall section to the inner piston element. The method can further include providing an outer piston element including a side wall, and open end and a pivot mount opposite the open end. The method can also include positioning the inner piston element and at least a portion of the first flexible wall section within the outer piston element such that a first rolling lobe is formed between the inner and outer piston elements. The method can further include providing an inner end element including a passage, and positioning the inner end element along the open end of the outer piston element such that the elongated rod of the rod assembly extends through the passage. The method can also include providing a second flexible wall section having a first end, and securing the first and second flexible wall sections and the inner end element along the open end of the outer piston element such that a first spring chamber is at least partially formed by the first flexible wall section. The method can further include providing a second end element including a passage formed therethrough. The method can also include positioning the second end element along the rod assembly such that the elongated rod extends through the passage, and securing the first end of the second flexible wall section to the second end element such that a second spring chamber is at least partially formed by the second flexible wall section. The second spring chamber being in fluid communication with the first spring chamber. The method can further include providing an end nut with a pivot mount formed thereon, and securing the end nut along the second end of the elongated rod. The method can also include orienting the pivot mount of the outer piston element and the pivot mount of the end nut relative to one another such that the pivot mounts are in approximate alignment with one another. The method can further include transferring pressurized gas into the first and second spring chambers and thereby urging the inner piston element in an axially-outward direction and into a second position in which the end nut is rotatably fixed relative to the inner piston element.

DETAILED DESCRIPTION

Figure 1:
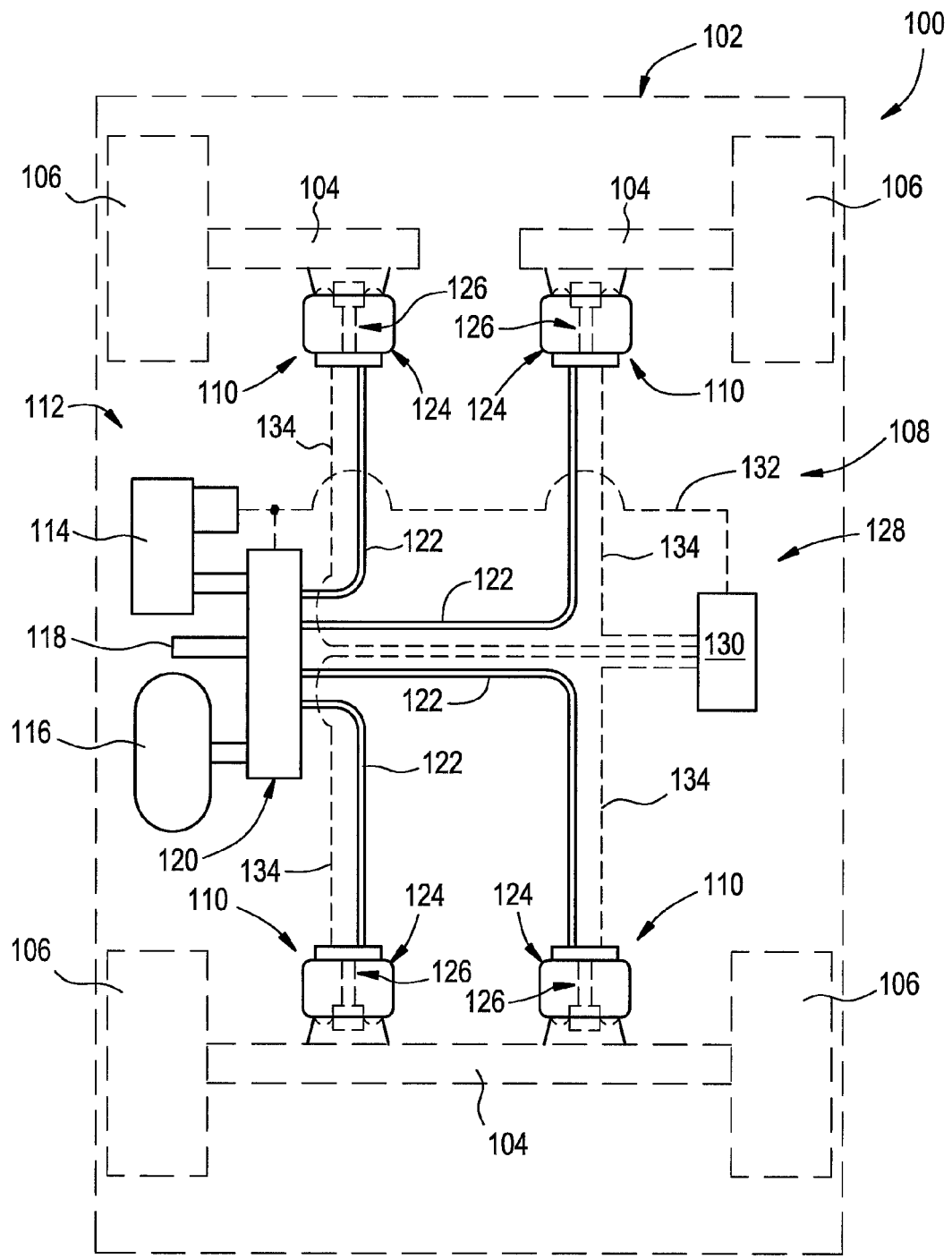
FIG. 1 is a schematic representation of one example of a vehicle including a suspension system utilizing gas spring and gas damper assemblies in accordance with the subject matter of the present disclosure.

Turning now to the drawings wherein the showings are for the purpose of illustrating exemplary embodiments of the present novel concept and not for limiting the same, FIG. 1 illustrates a vehicle 100 having a sprung mass, such as a vehicle body 102, for example, and an unsprung mass, such as axles 104 and/or wheels 106, for example. Additionally, vehicle 100 can include a suspension system 108 that is operatively connected between the sprung and unsprung masses. Another example of sprung and unsprung masses with which a suspension system could be associated can include a cab or passenger compartment of a vehicle, such as a truck or tractor, for example, and the frame or structure upon which the cab or passenger compartment is supported.

The suspension system can include a plurality of gas spring and gas damper assemblies 110 that are operatively connected between the sprung and unsprung masses of the vehicle. Assemblies 110 can be disposed between the sprung and unsprung masses in any suitable manner, configuration and/or arrangement. For example, assemblies 110 are shown in FIG. 1 as being disposed adjacent wheels 106. Depending on desired performance characteristics and/or other factors, the suspension system may, in some cases, also include damping members (not shown) of a typical construction that are provided separately from assemblies 110 and secured between the sprung and unsprung masses in a conventional manner. In a preferred arrangement, however, gas spring and gas damper assemblies 110 will be sized, configured and operative to provide the desired performance characteristics for the suspension system without the use of additional damping members (e.g., conventional struts or shock absorbers) that are separately provided.

Vehicle 100 also includes a pressurized gas system 112 that is in communication with assemblies 110 and that is operative to selectively supply pressurized gas thereto and exhaust pressurized gas therefrom. Pressurized gas system 112 can include a pressurized gas source, such as a compressor 114, and can optionally include a storage vessel, such as a reservoir 116, for example, for receiving and storing pressurized gas, such as may be generated by the pressurized gas source. System 112 can further include a suitable exhaust, such as a muffler 118, for example, for venting or otherwise evacuating pressurized gas from the system.

Pressurized gas system 112 can be in communication with the gas spring and gas damper assemblies in any suitable manner. For example, system 112 can include a valve assembly 120 or other suitable device or arrangement for selectively distributing pressurized gas to, from and/or between the pressurized gas source or sources, the exhaust and/or the gas spring and gas damper assemblies. As shown in the exemplary embodiment in FIG. 1, compressor 114, reservoir 116 and muffler 118 are in fluid communication with valve assembly 120 and can be selectively placed in fluid communication with one another therethrough. Additionally, assemblies 110 are in fluid communication with valve assembly 120 by way of gas transmission lines 122 and, thus, can be selectively placed in communication with the compressor, reservoir, muffler and/or one another therethrough.

It will be appreciated that gas spring and gas damper assemblies 110 can take any suitable form, configuration and/or construction in accordance with the present novel concept. In the embodiment shown in FIG. 1, each assembly 110 includes a gas spring assembly 124 and a gas damper assembly, which is schematically represented in FIG. 1 by item number 126, that is substantially-entirely contained within gas spring assembly 124. Gas spring assemblies 124 include an elongated flexible wall that at least partially defines a spring chamber (not numbered), which is operative to receive and retain a quantity of pressurized gas. Gas damper assemblies 126 include a plurality of components that are telescopically interconnected with one another. One or more of the plurality of components of the gas damper assemblies are operatively interconnected with the flexible wall of the gas spring assembly to at least partially define a damping chamber that is in fluid communication with the spring chamber.

In operation of the exemplary embodiment shown in FIG. 1, valve assembly 120 can be selectively actuated to transfer pressurized gas from the compressor and/or reservoir to one or more of gas spring and gas damper assemblies 110 via one or more of gas transmission lines 122. Additionally, valve assembly 120 can be selectively actuated to exhaust pressurized gas from one or more of the gas spring and gas damper assemblies through the gas transmission lines by way of muffler 118 or another suitable arrangement. It will be appreciated that the foregoing pressurized gas system and operation thereof are merely exemplary and that any other suitable pressurized gas source, system and/or method of operation could alternately be used without departing from the subject matter of the present disclosure.

Vehicle 100 also includes a suspension control system 128 for selectively operating, adjusting or otherwise influencing or controlling the performance or one or more suspension system components, such as gas spring and gas damper assemblies 110 and/or pressurized gas system 112, for example. Suspension control system 128 can include an electronic control unit 130 in communication with one or more components of compressor 114 and/or valve assembly 120, such as through a communication line 132, for example, for selective actuation and/or operation thereof. Electronic control unit 130 is also shown in FIG. 1 as being in communication with suitable height sensing devices (not shown in FIG. 1) that can optionally be used in association with gas spring and gas damper assemblies 110. It will be appreciated that such communications can be implemented in any suitable manner, such as by way of communication lines 134, for example. Additionally, it will be appreciated that height sensors or any other distance-determining devices of any suitable type, kind, construction and/or configuration can be used, such as mechanical linkage sensors, ultrasonic wave sensors or electromagnetic wave sensors, for example. Additionally, other sensors, sensing devices and/or other such components can also, optionally, be used in connection with suspension control system 128, such as pressure sensors, accelerometers and/or temperature sensors, for example.

Figure 2:
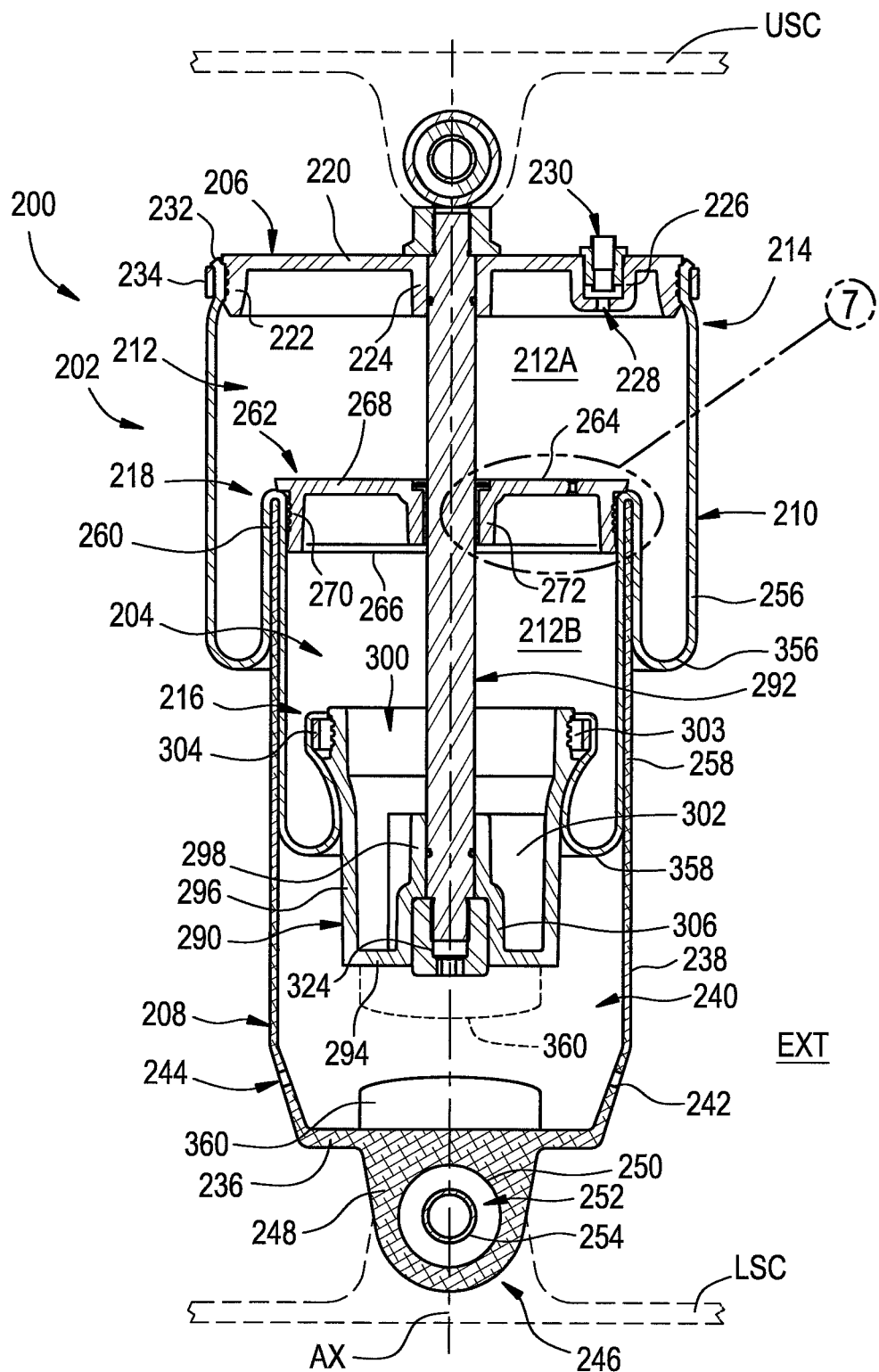
FIG. 2 is a side view, in partial cross section, of one example of a gas spring and gas damper assembly in accordance with the subject matter of the present disclosure.
Figure 3:
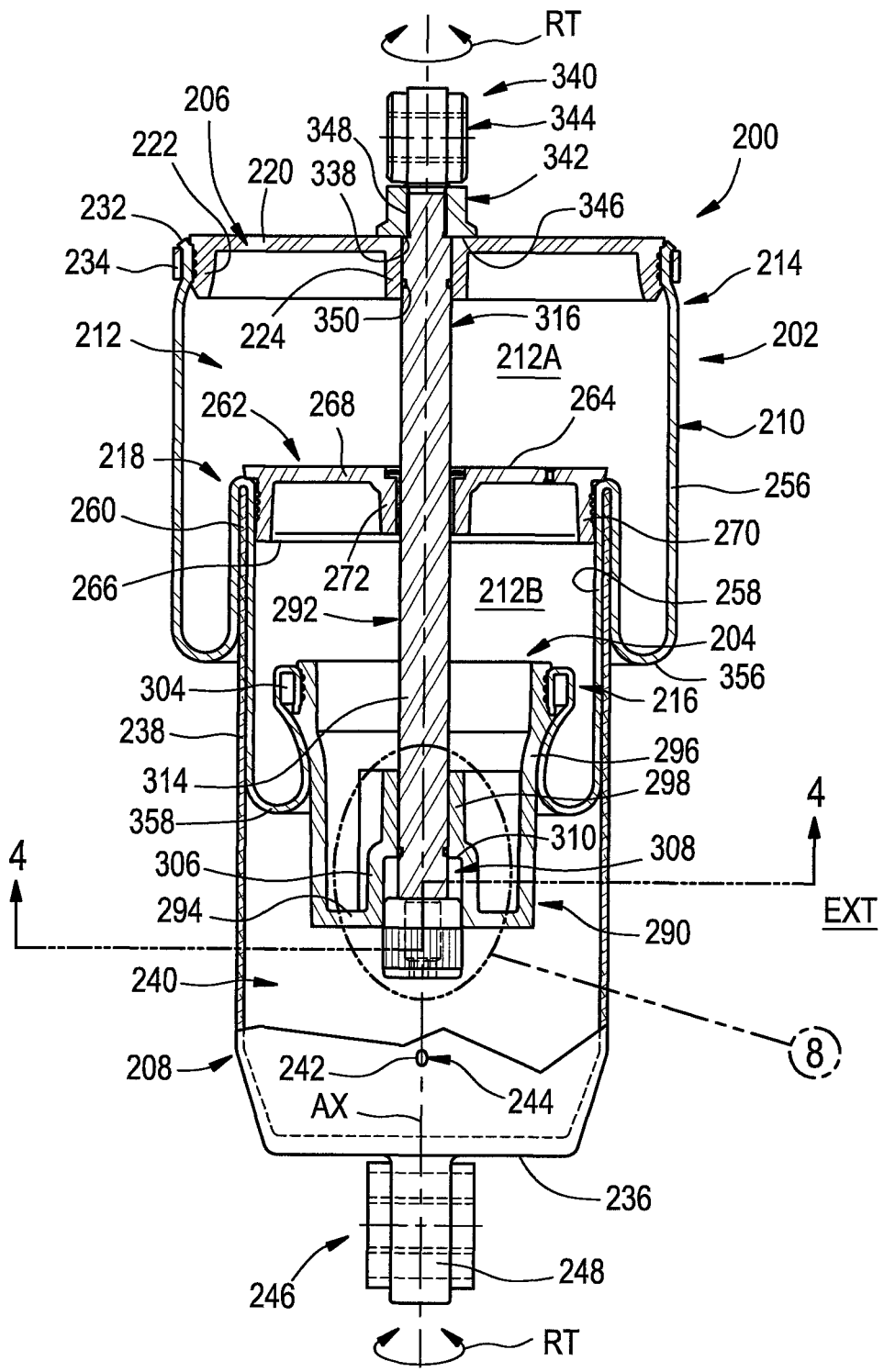
FIG. 3 is another side view of the gas spring and gas damper assembly shown in a partially assembled condition.
Figure 4:
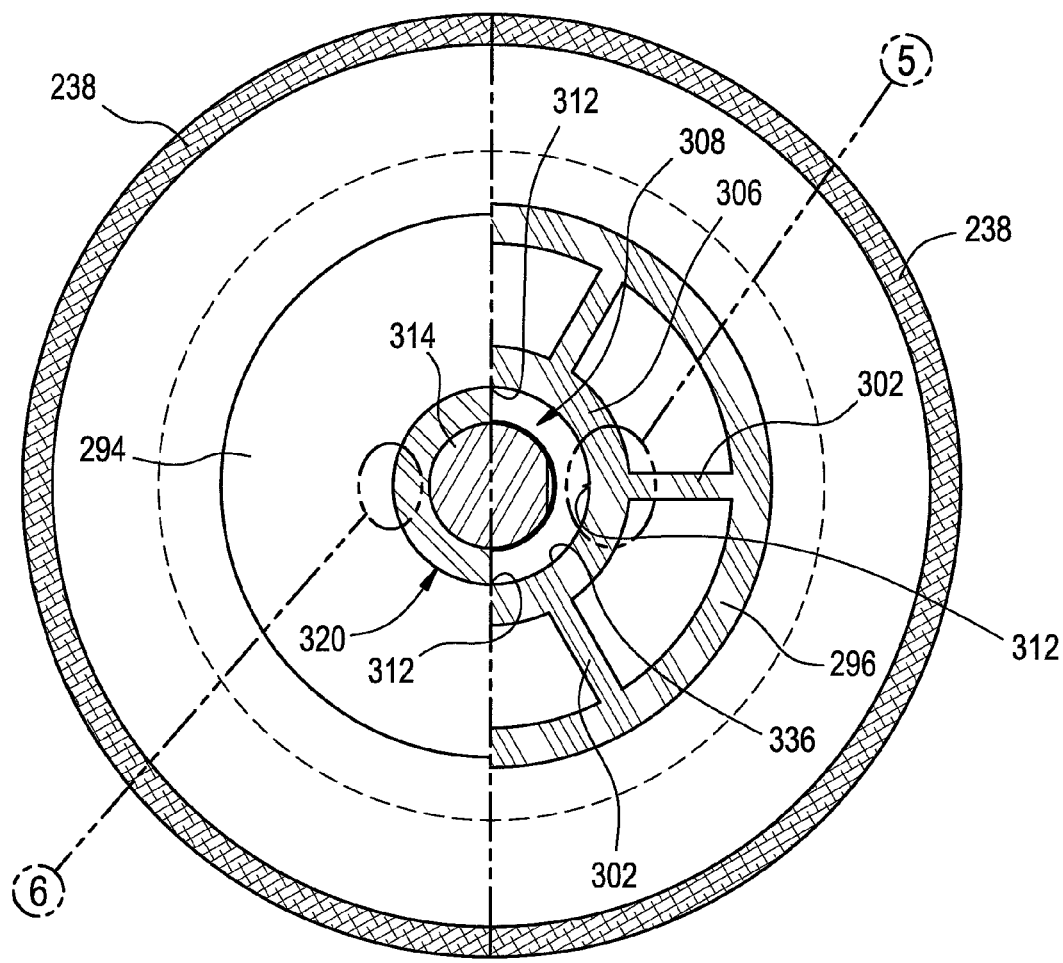
FIG. 4 is a cross-sectional side view of a portion of the gas spring and gas damper assembly in FIGS. 2 and 3 taken from along line 4-4 in FIG. 3.
Figure 5:
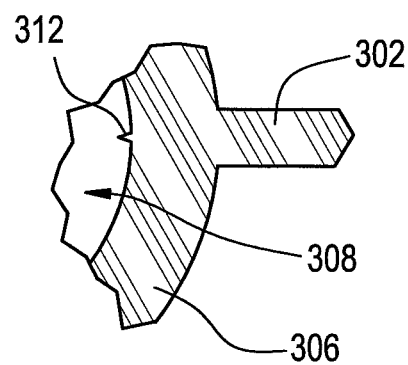
FIG. 5 is an enlarged view of the portion of the gas spring and gas damper assembly in FIGS. 2-4 identified as Detail 5 in FIG. 4.
Figure 6:
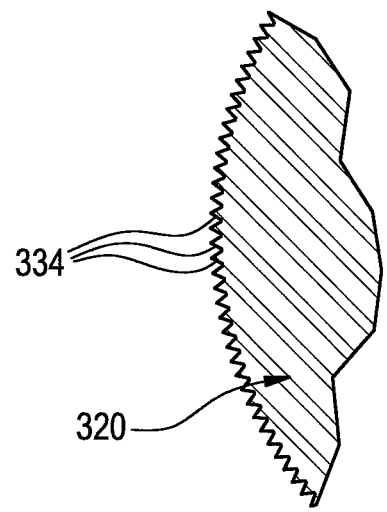
FIG. 6 is an enlarged view of the portion of the gas spring and gas damper assembly in FIGS. 2-4 identified as Detail 6 in FIG. 4.

One example of a gas spring and gas damper assembly 200 in accordance with the subject matter of the present disclosure, such as may be used as gas spring and gas damper assembly 110 in FIG. 1, for example, is shown in FIGS. 2-7. Gas spring and gas damper assembly 200 includes a gas spring assembly 202 and a gas damper assembly 204 that is substantially-entirely housed within the gas spring assembly. Gas spring assembly 202 can be of any type, kind, construction, configuration and/or arrangement, and is shown in FIGS. 2 and 3 as being of a rolling lobe-type construction that has a longitudinal axis and includes a first end member, an opposing second end member spaced longitudinally from the first end member and a flexible wall that is operatively connected therebetween. It will be appreciated, however, that other gas spring assembly constructions could alternately be used, such as, for example, a construction that includes two or more flexible walls in place of the single, elongated flexible wall shown in FIGS. 2 and 3. Additionally, gas spring and gas damper assembly 200 can be operatively connected between opposing structural components in any suitable manner, such as, for example, are generally represented in FIG. 2 by upper structural component USC (e.g., vehicle body 102 in FIG. 1) and lower structural component LSC (e.g., axle 104 in FIG. 1).

In the exemplary arrangement shown in FIGS. 2 and 3, gas spring assembly 202 has a longitudinally-extending axis AX and includes an end member (which may also be referred to herein as an "end element"), such as an end element 206, for example, and an opposing end member (which may also be referred to herein as an "end element"), such as a piston element 208, for example, that is spaced longitudinally from the end member (e.g., end element 206). A flexible wall, such as an elongated flexible sleeve 210, for example, can be secured between the end members (e.g., end element 206 and piston element 208) in a suitable manner such that a chamber 212 is at least partially formed therebetween.

Flexible sleeve 210 extends in a generally longitudinal manner between a sleeve end 214 and a sleeve end 216 with an intermediate portion 218 disposed therebetween. Flexible sleeve 210 can be operatively interconnected with components of the gas spring assembly and/or gas spring damper in any suitable manner. For example, one or both ends of the flexible sleeve can, optionally, include a mounting bead (not shown) or other connection feature, such as may include a reinforcing element (e.g., a bead wire) or other suitable component, for example.

In the exemplary arrangement shown in FIGS. 2 and 3, end element 206 includes an end wall 220 that extends transverse to axis AX, an outer peripheral wall 222, and a damper passage wall 224 that at least partially defines a damper passage (not numbered) extending through end wall 220. A fitting passage wall 226 can also be provided that at least partially defines a fitting passage 228 that extends through the end wall and is dimensioned to receive a suitable connector fitting 230, such as may be used to operatively interconnect spring chamber 212 with pressurized gas system 112, for example. Sleeve end 214 terminates at an outer edge 232. Sleeve end 214 is shown in FIGS. 2 and 3 as being disposed along outer peripheral wall 222 of end cap 206 and secured thereto by way of a retaining ring 234 that is crimped radially-inwardly or otherwise deformed to form a substantially fluid-tight seal between end cap 206 and sleeve end 214.

Piston element 208 is shown in FIGS. 2 and 3 as including an end wall 236 that extends transverse to axis AX and an outer side wall 238 that extends axially from end wall 236 in a direction toward end cap 206. Piston element 208 includes an inner chamber 240 that is at least partially defined by end wall 236 and outer side wall 238. The inner chamber has an open end (not numbered) opposite end wall 236. Piston element 208 can include one or more passages that permit fluid communication between inner chamber 240 and an external atmosphere EXT. In the exemplary arrangement shown in FIG. 2, passage walls 242 extend through end wall 236 and at least partially define passages 244. It will be appreciated, however, that any other suitable arrangement of passage walls could alternately be used.

Piston element 208 can also include a pivot mount 246 projecting from end wall 236 in a direction opposite the open end. Pivot mount 246 can be of any suitable construction and/or arrangement. In the arrangement shown in FIGS. 2 and 3, a boss 248 projects axially-outwardly from along end wall 236 in a direction away from the open end. Boss 248 includes a passage wall 250 that extends through the boss in a direction transverse to axis AX and at least partially defines a bearing passage (not numbered) for receiving a suitable pivot and/or bearing element. In the exemplary arrangement shown, an elastomeric bushing 252 having an inner sleeve 254 is shown received within the bearing passage. It will be recognized and appreciated, however, that other arrangements and/or configurations could alternately be used.

As mentioned above, flexible sleeve 210 extends lengthwise between opposing ends 214 and 216. Intermediate portion 218 is disposed between the opposing ends such that flexible wall sections 256 and 258 are formed on opposing sides thereof adjacent ends 214 and 216, respectively. As such, it will be recognized that flexible wall section 256 and 258 are formed from a single, unitary length of material. It will be appreciated, however, that two or more separate flexible wall sections could alternately be used.

Figure 7:
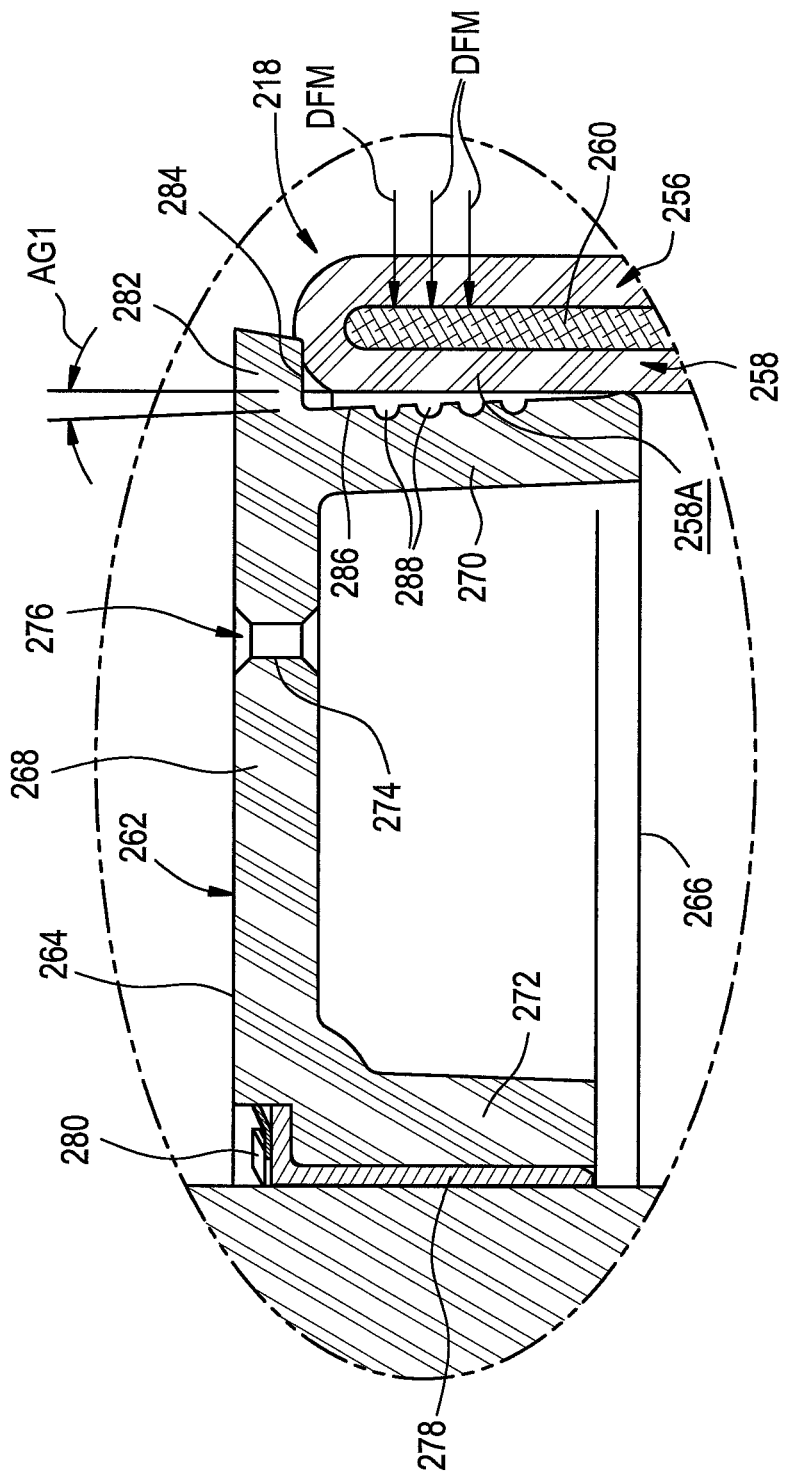
FIG. 7 is an enlarged view of the portion of the gas spring and gas damper assembly in FIGS. 2-4 identified as Detail 7 in FIG. 2.

As shown in FIGS. 2 and 3, intermediate portion 218 of flexible sleeve 210 is disposed along end 260 of outer side wall 238. Intermediate portion 218 can be secured on or along end 260 of the outer side wall in any suitable manner. As one example, gas damper assembly 204 can include an end member (which may also be referred to herein as an "end element"), such as end element 262, for example, that can be positioned within chamber 212 and extend transversely across the chamber to at least partially define opposing chamber portions 212A and 212B. End element 262 can include opposing sides 264 and 266, an end wall 268 that extends transverse to axis AX, an outer side wall 270, and a damper passage wall 272 that at least partially defines a damper passage (not numbered) extending through end wall 268. A passage wall 274 can also be provided that at least partially defines a fluid communication passage 276 that extends through the end wall and is dimensioned to permit the transfer of pressurized gas to, from and between chamber portions 212A and 212B. As shown in FIG. 7, a bearing element, such as a bushing 278, for example, can, optionally, be disposed along damper passage wall 272 and/or otherwise within the damper passage. If provided, such a bearing element can be retained on or along end element 262 in any suitable manner, such as through the use of a retaining element 280, for example. It will be appreciated, however, that other arrangements could alternately be used.

With further reference to FIG. 7, end element 262 also includes a shoulder portion 282 having a shoulder surface 284 disposed opposite side 264 that is at least partially formed by outer side wall 270 being positioned radially-inwardly a distance from an outermost peripheral edge (not numbered) of the end element. Outer side wall 270 includes an outer surface 286 and has sleeve-engaging features formed therealong, such as radially-inwardly extending grooves 288, for example.

End element 262 can be secured on or along the open end of piston element 208 in any suitable manner. Additionally, one or more flexible wall sections can be secured on or along the open end of the piston element in any suitable manner. In the exemplary arrangement shown in FIGS. 2, 3 and 7, end element 262 is at least partially received within the open end of piston element 208 such that at least a portion of outer side wall 270 abuttingly engages flexible wall section 258 and shoulder portion 282 abuttingly engages intermediate portion 218 of the flexible wall. In some cases, it may be preferable to form a substantially fluid-tight seal between the one or more flexible wall sections, end 260 of outer side wall 238 and end element 262. It will be appreciated that such a connection can be formed in any suitable manner. For example, end 260 of outer side wall 238 can be radially-inwardly displaced, such as is represented in FIG. 7 by arrows DFM, to crimp or otherwise deform the outer side wall and thereby compressively interengage portion 258A of flexible wall section 258 between end element 262 and outer side wall 238. The robustness of the connection between the outer side wall, the end element and the one or more flexible wall sections can be, optionally, improved by orienting outer surface 286 at an inward angle in the direction from side 266 toward side 264, such as is represented in FIG. 7 by reference dimension AG1, for example. It will be appreciated, that any suitable angle can be used, such as an angle within a range of from approximately 1 degree to approximately 10 degrees, for example.

Gas damper assembly 204 can also include an end member (which may also be referred to herein as an "end element"), such as a piston element 290, for example, that is spaced longitudinally from an end member of the gas spring assembly (e.g., end element 206). Additionally, a rod assembly 292 can operatively connect piston element 290 to end element 206, such as may be used to maintain a substantially fixed spacing therebetween during dynamic use and operation. Piston element 290 can include an end wall 294 that is disposed transverse to axis AX and an outer side wall 296 that extends axially from along end wall 294 in a direction toward end element 262. Piston element 290 can also include a passage wall 298 that at least partially defines an element passage (not numbered) that extends longitudinally through the piston element. Outer side wall 296 can at least partially define an open end 300 (FIG. 2) of piston element 290. In some cases, piston element 290 can, optionally, include support walls 302 (FIG. 2) extending between and operatively interconnecting passage wall 298 with outer side wall 296.

As discussed above, sleeve end 216 is shown in FIGS. 2 and 3 as terminating at an outer edge (not numbered), rather than having a mounting bead or other connection feature. Sleeve end 216 is disposed along outer side wall 296 of end element 290 and is secured thereto by way of a retaining ring 304 that is crimped radially-inwardly or otherwise deformed to form a substantially fluid-tight seal between end element 290 and the sleeve end. It will be appreciated, however, that other arrangements and/or configurations could alternately be used.

Figure 8:
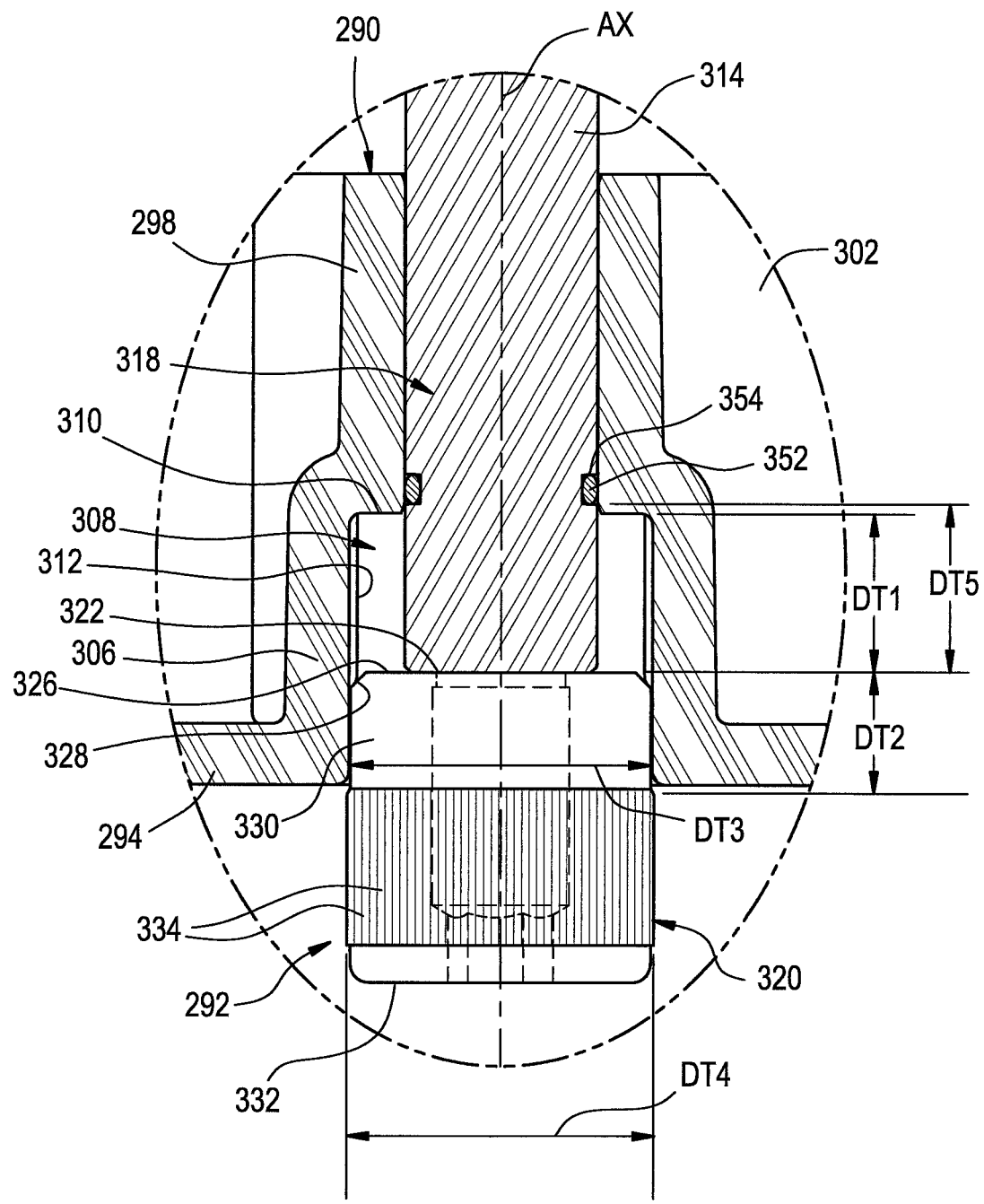
FIG. 8 is an enlarged view of the portion of the gas spring and gas damper assembly in FIGS. 2-6 identified as Detail 8 in FIG. 3

Piston element 290 can also include a recess wall 306 that extends circumferentially about axis AX and axially interconnects end wall 294 and passage wall 298. Recessed wall 306 at least partially defines a recess 308 (FIGS. 3 and 4) extending axially into piston element 290 from along end wall 294 and terminating at a bottom surface 310 that extends transverse to the axis. Piston element 290 can, optionally, include one or more interengagement features that abuttingly engage one or more components of rod assembly 292, such as, for example, may be used during assembly of gas spring and gas damper assembly 200. In the exemplary arrangement shown in FIGS. 4 and 5, piston element 290 includes a plurality of projections 312 that extend from along bottom surface 310 and terminate at a distance from end wall 294, such as is represented in FIG. 8 by reference dimension DT1. In such case, projections 312 can function as standoffs that maintain a component of rod assembly 292 in spaced relation to bottom surface 310 prior to final assembly of the gas spring and gas damper assembly.

Rod assembly 292 extends longitudinally through gas spring and gas damper assembly 200 and can include a damper rod 314 that extends longitudinally along axis AX and between opposing ends 316 (FIG. 3) and 318 (FIG. 8). Rod assembly 292 also includes an end nut 320 that is disposed along end 318 of damper rod 314. There will be appreciated that end nut 320 can be provided in any suitable manner. As one example, the end nut could be integrally formed with the damper rod, such as, for example, through the use of a cold heading process. Alternately, as shown in FIGS. 2-4 and 8, end nut 320 can be provided as a separate component that is secured on or along the damper rod in a suitable manner. In the exemplary arrangement shown, damper rod 314 includes a shoulder wall 322 (FIG. 8) and a plurality of threads (not numbered) that extend axially-outwardly beyond the shoulder wall.

End nut 320 includes a passage wall 324 (FIG. 2) that includes a plurality of threads (not numbered) dimensioned to cooperatively interengage the plurality of threads along end 318 of damper rod 314 such that an end surface 326 (FIG. 8) of end nut 320 abuttingly engages shoulder wall 322. A chamfer 328 or other edge relief feature can, optionally, be included on or along the end nut adjacent end surface 326. End nut 320 also includes an outer side surface 330 that extends axially from along end surface 326 toward an opposing end surface 332. A surface roughening treatment, such as a knurl, for example, can be included on or along the end nut. In the exemplary arrangement shown, a plurality of ribs 334 are disposed in circumferentially spaced relation to one another around end nut 320. In a preferred arrangement, the surface treatment (e.g., ribs 334) is disposed a distance from end surface 322, which distance is represented in FIG. 8 by reference dimension DT2, for example, such that outer side surface 330 remains substantially smooth or otherwise without a surface roughening treatment and the surface roughened area can remain disengaged from piston element 290.

Additionally, outer side surface 330 is preferably dimensioned for receipt within recess 308 while maintaining clearance between inside surface 336 (FIG. 4) of recess wall 306. In which case, end nut 320 can be assembled into an initial position (shown in FIGS. 3 and 8) within recess 308 such that end surface 326 (or chamfer 328) abuttingly engages the distal end (not numbered) of projections 312 and thereby remain rotatable relative to piston element 290. During final assembly, as will be discussed hereinafter, end nut 320 can be urged into a final position (shown in FIG. 2) in which the surface roughening treatment (e.g., plurality of ribs 334) interengages recess wall 306 and/or projections 312 to maintain the end nut in a fixed rotational position relative to piston element 290. As such, in a preferred arrangement, outer side surface 330 can have a cross-sectional dimension, which is represented in FIG. 8 by reference dimension DT3, that is less than the cross-sectional dimension of the area having the surface roughening treatment (e.g., plurality of ribs 334), which is represented in FIG. 8 by reference dimension DT4.

Damper rod 314 extends axially from along end 318 through the element passage (not numbered) that is at least partially defined by passage wall 298 of piston element 290.

The damper rod further extends through the damper passage (not numbered) that is at least partially defined by damper passage wall 272 and/or bushing 278. Damper rod 314 still further extends through the damper passage (not numbered) that is at least partially defined by damper passage wall 224. End 316 of damper rod 314 can be operatively interconnected on or along end element 206 in any suitable manner. In the exemplary arrangement shown in FIGS. 2 and 3, damper rod 314 can include a shoulder wall 338 and a plurality of threads (not numbered) that extend axially-outwardly beyond the shoulder wall. A mounting feature of any suitable type, kind and/or construction can be used to operatively interconnect end 316 of damper rod 314 and/or end element 206 to an associated mounting structure, such as upper structural component USC, for example. In the exemplary arrangement shown, a pivot nut 340 can include a nut body 342 and a pivot element 344 that is fixedly attached thereto. Nut body 342 can include a bottom surface 346 and an inside wall 348 that includes a plurality of threads (not numbered). Pivot nut 340 can be threadably secured along end 316 of the damper rod such that bottom surface 346 of the nut body abuttingly engages shoulder wall 338.

Additionally, gas spring damper 204 can include one or more sealing elements operatively disposed between the damper rod and one or more of the end elements (e.g., end elements 206 and 262) and piston elements (e.g., piston elements 208 and 290). In the exemplary arrangement shown, a sealing element 350 is operatively disposed between damper rod 314 and damper passage wall 224. Additionally, a sealing element 352 is operatively disposed between damper rod 314 and passage wall 298 of piston element 290. As such, a substantially fluid-tight seal can be formed between the damper rod and end element 206, and between the damper rod and piston element 290. It will be appreciated that any suitable arrangement or configuration can be used for mounting and retaining the one or more sealing elements on or along the damper rod. For example, an endless groove (not numbered) can extend radially inwardly into the damper rod toward end 316 and an endless groove 354 (FIG. 8) can extend radially inwardly into damper rod 314 toward end 318. Endless groove 354 is shown as being positioned at a distance, which distance is represented in FIG. 8 by reference dimension DT5, relative to shoulder wall 322 and/or end surface 326. In a preferred arrangement, distance DT5 is greater than the length of projections 312, which are represented in FIG. 8 by reference dimension DT1, such that in the initial position (shown in FIGS. 3 and 8) sealing element 352 engages damper rod 314 and passage wall 298 such that a substantially fluid-tight seal is formed therebetween.

Flexible wall sections 256 and 258 respectively form rolling lobes 356 and 358 along the outer side walls of piston elements 208 and 290. It will be recognized that a wide variety of shapes, profiles and/or configurations can and have been used in forming the outer side wall of piston elements, such as outer side wall 238 of piston element 208 and outer side wall 296 of piston element 290. As such, it will be appreciated that the outer side walls thereof can be of any suitable shape, profile and/or configuration and that the profiles shown in FIGS. 2 and 3 are merely exemplary. Additionally, it will be appreciated that the end elements (e.g., end elements 206 and 262) and the piston elements (e.g., piston elements 208 and 290) can be formed from the suitable material for combination of materials. As examples, end element 206 and/or piston element 208 can be formed from a metal, such as steel or aluminum, for example. As further examples, end elements 262 and/or piston element 290 can be formed from a polymeric material, such as a reinforced or unreinforced polyamide, for example.

It will be appreciated that it is generally desirable for pivot mount 246 and pivot element 344 of pivot nut 340 to have axis AX2 (FIG. 3) that are disposed in approximate alignment with one another, such as from within approximately ½ degree to approximately 10 degrees of rotational alignment about axis AX, for example. One feature of the subject construction is that relative positioning of the components can be achieved prior to final assembly. As discussed above, piston element 290 and end nut 320 are assembled into an initial position during the process of assembling the gas spring and gas damper assembly. In this initial position, it will be recognized that damper rod 314 and end nut 320 are rotatable relative to piston element 290, which is set in a substantially fixed rotational position relative to piston element 208. As such, pivot nut 340, damper rod 314 and end nut 320 can be rotated relative to piston element 208 such that the pivot mount and the pivot element are in approximate alignment with one another, such as is represented in FIG. 3 by arrows RT. Once aligned, the gas spring and gas damper assembly can be inflated. The pressurized gas within chamber 212 will urge piston element 290 into an axially-outward position in which ribs 334 engage recess wall 306, and crush or otherwise deform projections 312 such that end nut 320, damper rod 314 and pivot nut 340 become rotationally fixed relative to piston element 290 and, thus, relative to pivot mount 246 of piston element 208.

Gas damper assembly 204 is shown in FIGS. 2 and 3 as being substantially entirely contained within gas spring assembly 202. As gas spring and gas damper assembly undergoes extension and compression during normal use in operation, end element 206 and piston element 290 will move together relative to end element 262 and piston element 208, which will also move together. During extension, pressurized gas from chamber portion 212B will be urged through passage 276 of end element 262 and into chamber portion 212A. During compression, pressurized gas from chamber portion 212A will be urged through passage 276 and into chamber portion 212B. In a preferred arrangement, passage 276 will be configured to result in the dissipation of kinetic energy acting on the gas spring and gas damper assembly. As such, it will be appreciated that any suitable number of passages of any suitable size, shape and/or configuration can be used. Additionally, one or more valves or other fluid flow control devices can, optionally, be included on or along end element 262.

As discussed above, piston elements 208 and 290 move relative to one another during use in operation. As such, a bumper 360 (FIG. 2) or other cushioning element can optionally be disposed on or along end wall 236 and/or end wall 294 to prevent or at least minimize the possibility of direct physical contact between the components. Additionally, gas spring and gas damper assembly 200 can optionally include any number or one or more additional element, features and/or components. For example, a distance sensing device can be operatively connected on or along one of the components of the gas spring assembly or the gas damper assembly.

Figure 9:
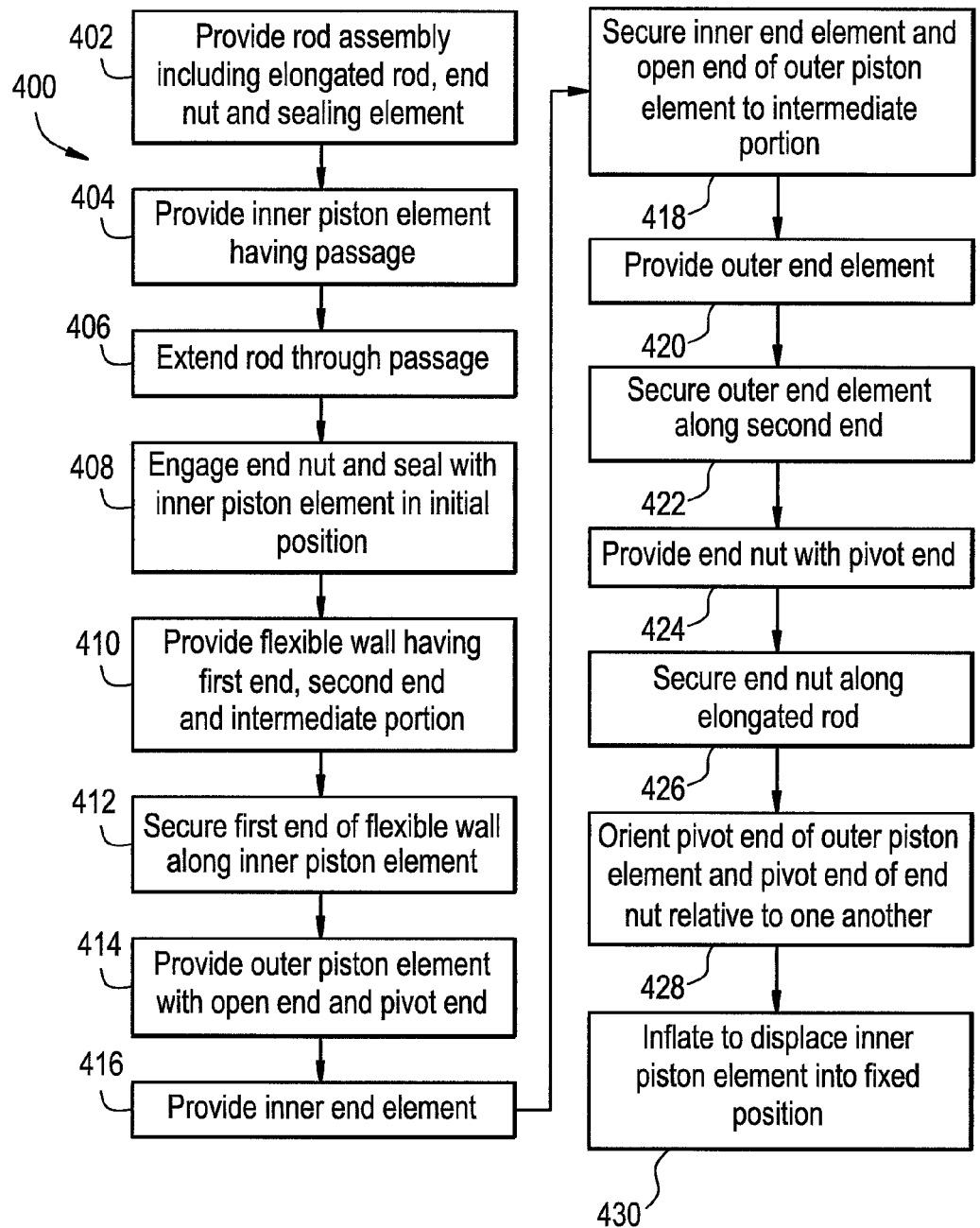
FIG. 9 is a graphical representation of one example of a method of assembling a gas spring and gas damper assembly in accordance with the subject matter of the present disclosure.

One example of a method of assembling a gas spring and gas damper assembly in accordance with the subject matter of the present disclosure, such as gas spring and gas damper assembly 102 and/or 200, for example, is illustrated in FIG. 9 as method 400. The method can include providing a rod assembly, such as rod assembly 292, for example that includes a damper rod, an end nut and one or more sealing elements, such as is represented by item 402. The method can also include providing and inner piston element having a passage, such as piston element 290, for example, such as is represented by item 404. The method can further include extending the damper rod through the passage of the inner piston element, such as is represented by item 406.

Method 400 can also include engaging the end nut and sealing element with the inner piston element in an initial position, such as is represented in FIG. 9 by item 408. Method 400 can further include providing a flexible wall, such as flexible wall 210, for example having a first end, a second end and an intermediate portion, such as is represented by item 410. Method 400 can also include securing the first end of the flexible wall along the inner piston element, such as is represented by item 412. Method 400 can further include providing and outer piston element, such as piston element 208, for example, that includes an open end and a pivot end, such as is represented by item 414. The method can also include providing an inner end element, such as end elements 262, for example, such as is represented by item 416. Method 400 can further include securing the intermediate portion of the flexible wall on, along or between the inner end element and the open end, such as is represented by item 418.

Method 400 can also include providing an outer end element, such as end element 206, for example, and securing the outer end element on or along the second end of the flexible wall, such as is represented in FIG. 9 by items 420 and 422, respectively. Method 400 can further include providing an end nut with a pivot end, such as pivot nut 340, for example, and securing the end nut on or along the damper rod, such as is represented by items 424 and 426, respectively. The method can further include rotating or otherwise orienting the pivot end (e.g., pivot mount 246) of the outer piston element (e.g., piston element 208) and the pivot end (e.g., pivot element 344) of the end nut (e.g., pivot nut 340) into approximate alignment relative to one another, such as is represented in FIG. 9 by item 428. Method 400 can also include inflating or otherwise transferring pressurized gas into the gas spring and gas damper assembly and thereby displacing the inner piston element (e.g., piston element 290) in an axially-outwardly direction and into rotationally-fixed engagement with the inner piston element, such as is represented by item 430.

Figure 10:
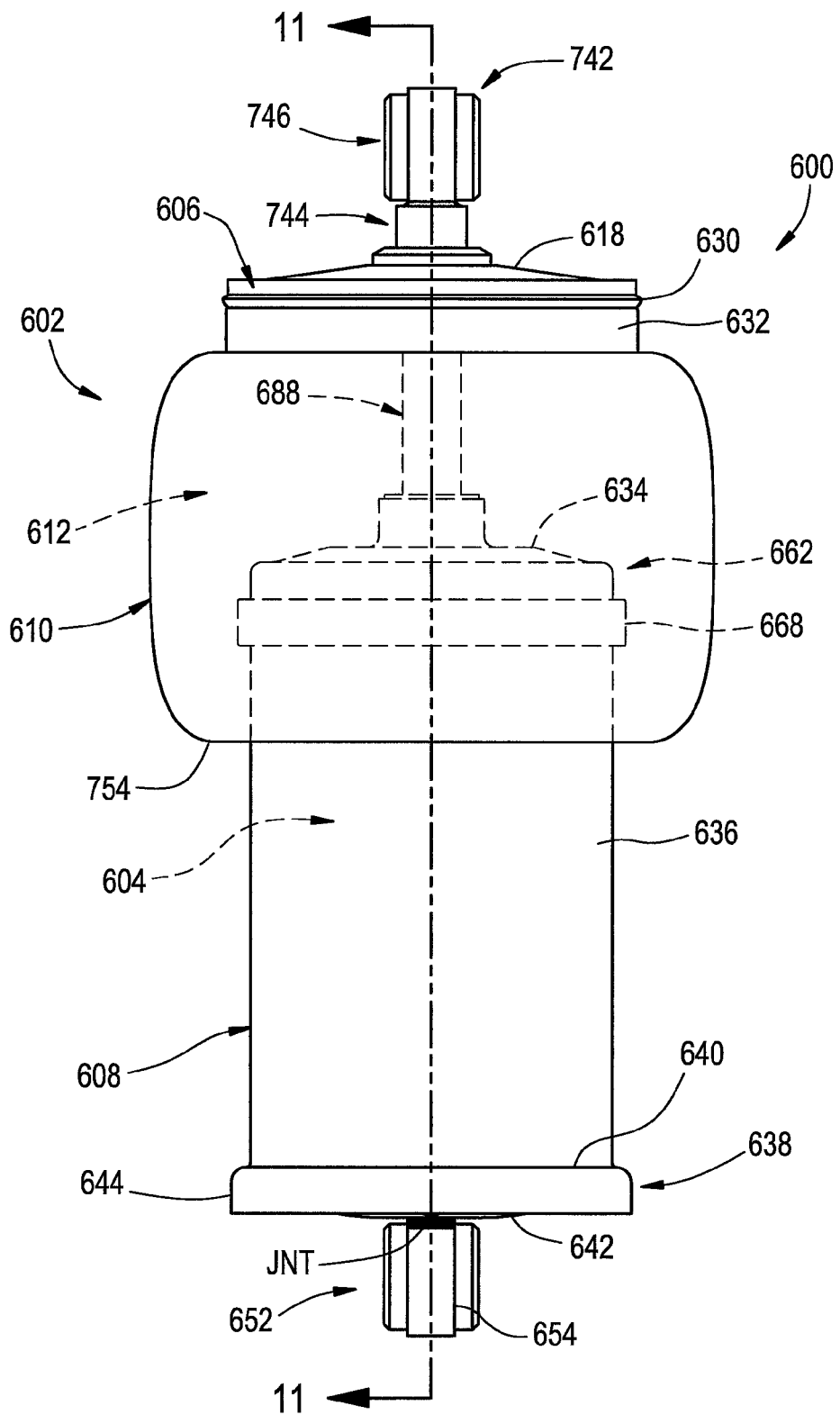
FIG. 10 is a side view of another example of a gas spring and gas damper assembly in accordance with the subject matter of the present disclosure.
Figure 11:
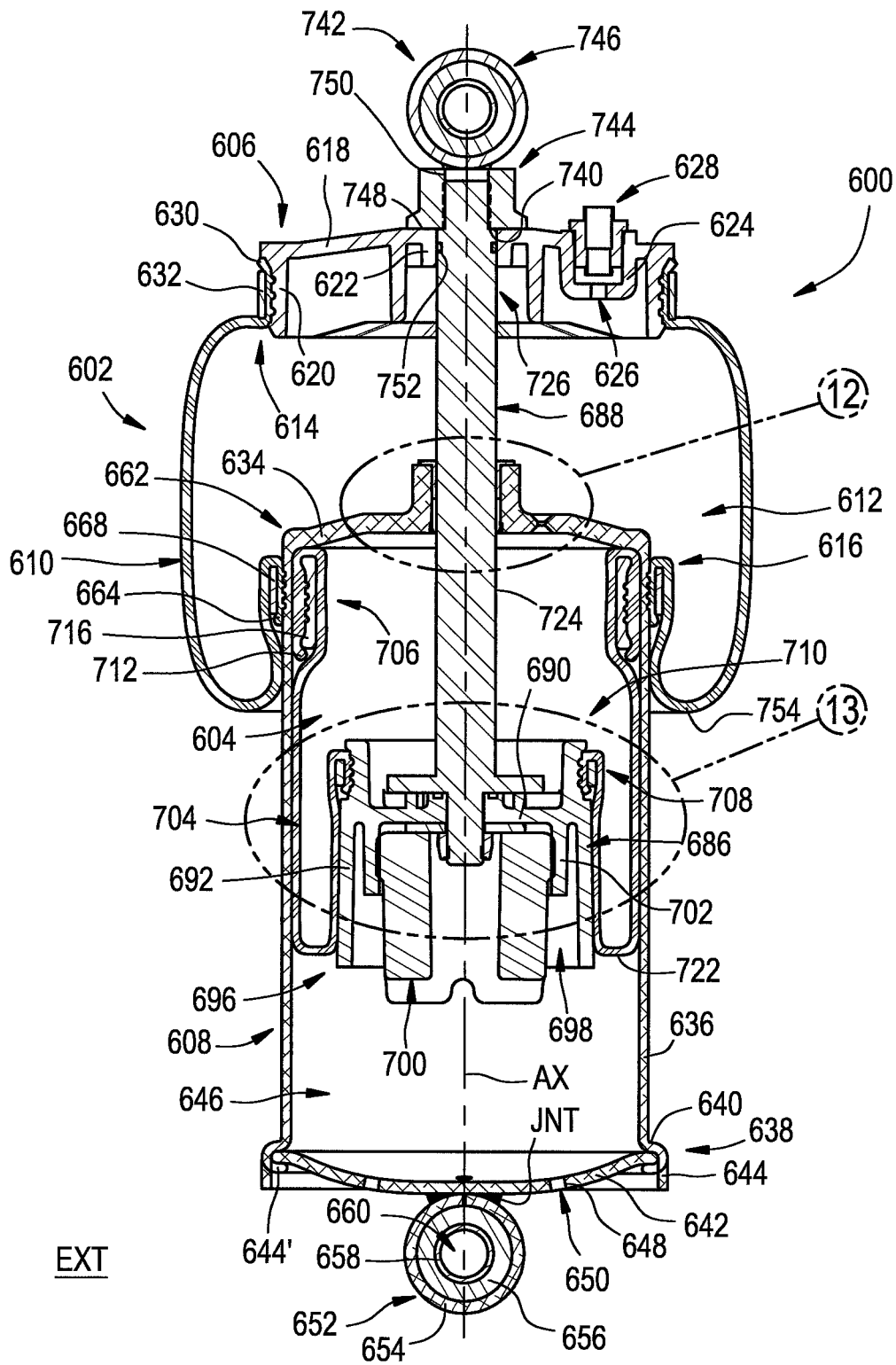
FIG. 11 is a cross-sectional side view of the gas spring and gas damper assembly in FIG. 10 taken from along line 11-11 thereof.

Another example of a gas spring and gas damper assembly 600 in accordance with the subject matter of the present disclosure, such as may be used as gas spring and gas damper assembly 110 in FIG. 1, for example, is shown in FIGS. 10-13. Gas spring and gas damper assembly 600 includes a gas spring assembly 602 and a gas damper assembly 604 that is substantially-entirely housed within the gas spring assembly. Gas spring assembly 602 can be of any type, kind, construction, configuration and/or arrangement, and is shown in FIGS. 10 and 11 as being of a rolling lobe-type construction that has a longitudinal axis and includes a first end member, an opposing second end member spaced longitudinally from the first end member and a flexible wall that is operatively connected therebetween.

Gas spring and gas damper assembly 600 can be operatively connected between opposing structural components in any suitable manner, such as, for example, are generally represented in FIG. 2 by upper structural component USC (e.g., vehicle body 102 in FIG. 1) and lower structural component LSC (e.g., axle 104 in FIG. 1).

In the exemplary arrangement shown in FIGS. 10 and 11, gas spring assembly 602 has a longitudinally-extending axis AX and includes an end member (which may also be referred to herein as an "end element"), such as an end element or end cap 606, for example, and an opposing end member (which may also be referred to herein as an "end element"), such as a piston element 608, for example, that is spaced longitudinally from the end member (e.g., end element 606). A flexible wall, such as an elongated flexible sleeve 610, for example, can be secured between the end members (e.g., end element 606 and piston element 608) in a suitable manner such that a chamber 612 is at least partially formed therebetween.

Flexible sleeve 610 extends in a generally longitudinal manner between a sleeve end 614 and a sleeve end 616. Flexible sleeve 610 can be operatively interconnected with components of the gas spring assembly and/or gas damper assembly in any suitable manner. In some cases, one or both ends of the flexible sleeve can, optionally, include a mounting bead (not shown) or other connection feature, such as may include a reinforcing element (e.g., a bead wire) or other suitable component, for example. In other cases, the ends of the flexible sleeve can take the form of cut ends along which the reinforcing cords of the flexible sleeve are exposed.

In the exemplary arrangement shown in FIGS. 10 and 11, end element 606 includes an end wall 618 that extends transverse to axis AX, an outer peripheral wall 620, and a damper passage wall 622 that at least partially defines a damper passage (not numbered) extending through end wall 618. A fitting passage wall 624 can also be provided that at least partially defines a fitting passage 626 that extends through the end wall and is dimensioned to receive a suitable connector fitting 628, such as may be used to operatively interconnect spring chamber 612 with pressurized gas system 112, for example. Sleeve end 614 terminates at an outer edge 630. Additionally, sleeve end 614 is shown in FIGS. 10 and 11 as being disposed along outer peripheral wall 620 of end cap 606 and secured thereto by way of a retaining ring 632 that is crimped radially-inwardly or otherwise deformed to form a substantially fluid-tight seal between end cap 606 and sleeve end 614.

Piston element 608 is shown in FIGS. 10 and 11 as including an end wall 634 that extends transverse to axis AX and an outer side wall 636 that extends axially from end wall 634 in a direction away from end cap 606 toward an open end (not numbered). Outer side wall 636 includes a distal end 638 disposed opposite end wall 634 that is expanded outwardly to form a shoulder or seat 640 along the open end. An end wall 642 is received within the open end and positioned along seat 640. End wall 642 can be secured on or along the outer side wall in any suitable manner. As one example, a portion 644 of outer side wall 636 can be crimped or otherwise deformed at least partially around end wall 642 to capture the end wall between portion 644 and seat 640, such as is represented in FIG. 11 by portion 644', for example Piston element 608 includes an inner chamber 646 that is at least partially defined by end wall 634, outer side wall 636 and end wall 642. Piston element 608 can include one or more passages that permit fluid communication between inner chamber 646 and an external atmosphere EXT. In the exemplary arrangement shown in FIG. 11, passage walls 648 extend through end wall 642 and at least partially define passages 650. It will be appreciated, however, that any other suitable arrangement of passage walls could alternately be used.

Piston element 608 can also include a pivot mount 652 projecting from end wall 642 in a direction opposite the end wall 634. Pivot mount 652 can be of any suitable configuration, construction and/or arrangement. In the arrangement shown in FIGS. 10 and 11, for example, an outer ring 654 is secured along end wall 642 in a suitable manner, such as by way of a flowed material joint (e.g., a weld joint) JNT, for example. Outer ring 654 includes a ring wall (not numbered) that extends in a lengthwise direction transverse to axis AX and at least partially defines a bearing passage (not numbered) for receiving a suitable pivot and/or bearing element. In the exemplary arrangement shown, an elastomeric bushing 656 having an inner sleeve 658 is received within the bearing passage and at least partially defines a mounting passage 660, as identified in FIG. 11. It will be recognized and appreciated, however, that other arrangements and/or configurations could alternately be used.

As shown in FIG. 11, sleeve end 616 of flexible sleeve 610 is disposed along a proximal end 662 of outer side wall 636 adjacent end wall 634. Sleeve end 616 terminates at an outer edge 664 and can be secured on or along proximal end 662 of the outer side wall in any suitable manner. As one example, sleeve end 616 can be disposed along outer side wall 636, such as in a position toward end wall 634, for example, and secured thereto by way of a retaining ring 668 that is crimped radially-inwardly or otherwise deformed to form a substantially fluid-tight seal between outer side wall 636 and sleeve end 616.

Figure 12:
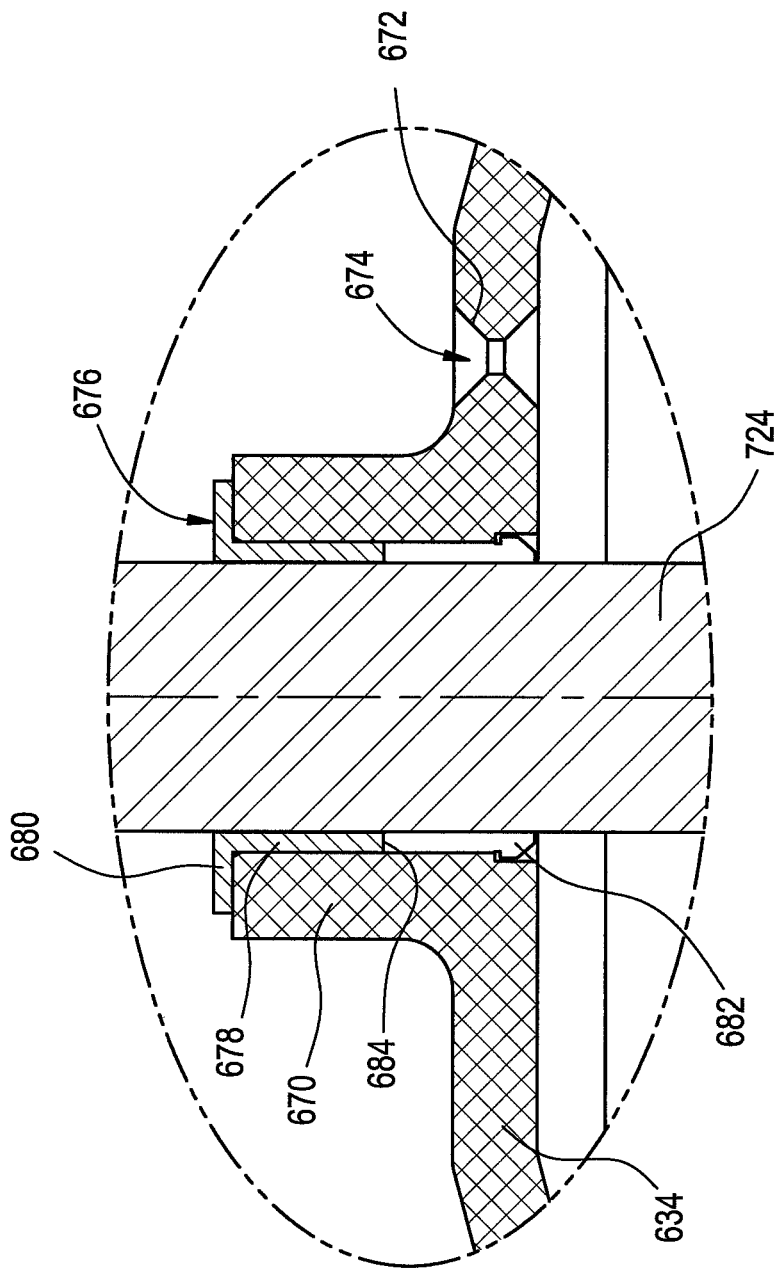
FIG. 12 is an enlarged view of the portion of the gas spring and gas damper assembly in FIGS. 10 and 11 identified as Detail 12 in FIG. 11.

In the preferred arrangement shown in FIGS. 11 and 12, end wall 634 is integrally connected or otherwise non-removably attached to outer side wall 636. End wall 634 extends transverse to axis AX and includes a damper passage wall 670 that at least partially defines a damper passage (not numbered) extending through end wall 634. End wall 634 can also include one or more passages that permit the transfer of pressurized gas into and out of spring chamber 612. As one example, end wall 634 can include a passage wall 672 (FIG. 12) that at least partially defines a communication passage 674 (FIG. 12) that extends through end wall 634 and is dimensioned to permit the transfer of pressurized gas into and out of spring chamber 612.

As shown in FIGS. 11 and 12, a bearing element, such as a bushing 676, for example, can, optionally, be disposed along damper passage wall 670 and/or otherwise within the damper passage formed thereby. If provided, such a bearing element can be retained on or along end wall 634 in any suitable manner. As one example, bushing 676 can include a side wall 678 that extends axially along damper passage wall 670, a flange 680 that extends radially-outwardly from along side wall 678, and a retaining ridge 682 disposed along side wall 678 opposite flange 680, as are identified in FIG. 13. The retaining ridge can be expanded in an outward direction to engage end wall 634 to provide axial retention of the bushing. In some cases, one or more slots 684 can, optionally, extend through side wall 678 to facilitate radial outward expansion of one or more sections of retaining ridge 682. It will be appreciated, however, that other arrangements could alternately be used.

Gas damper assembly 604 can include an end member (which may also be referred to herein as an "end element"), such as a piston element 686, for example, that is spaced longitudinally from an end member of the gas spring assembly (e.g., end cap 606). Additionally, a rod assembly 688 can operatively connect piston element 686 and end element 606, such as may be used to maintain a substantially fixed spacing therebetween during dynamic use and operation. Piston element 686 can include an end wall 690 that is disposed transverse to axis AX and an outer side wall 692 that extends axially from along end wall 690 in a direction toward end wall 642. Piston element 686 can also include a passage wall 694 that at least partially defines an element passage (not numbered) that extends longitudinally through the piston element. Outer side wall 692 can at least partially define an end 696 of piston element 686. In some cases, piston element 686 can, optionally, include a cavity 698 dimensioned to receive a bumper 700. In some cases, a bumper mounting wall 702 can, optionally, be included that extends axially from along end wall 690 and is spaced radially-inwardly from outer side wall 692. Bumper mounting wall 702, if included, can be dimensioned to receivingly engage bumper 700, such as by way of a press-fit connection, a threaded connection and/or a flowed-material joint, for example.

Figure 13:
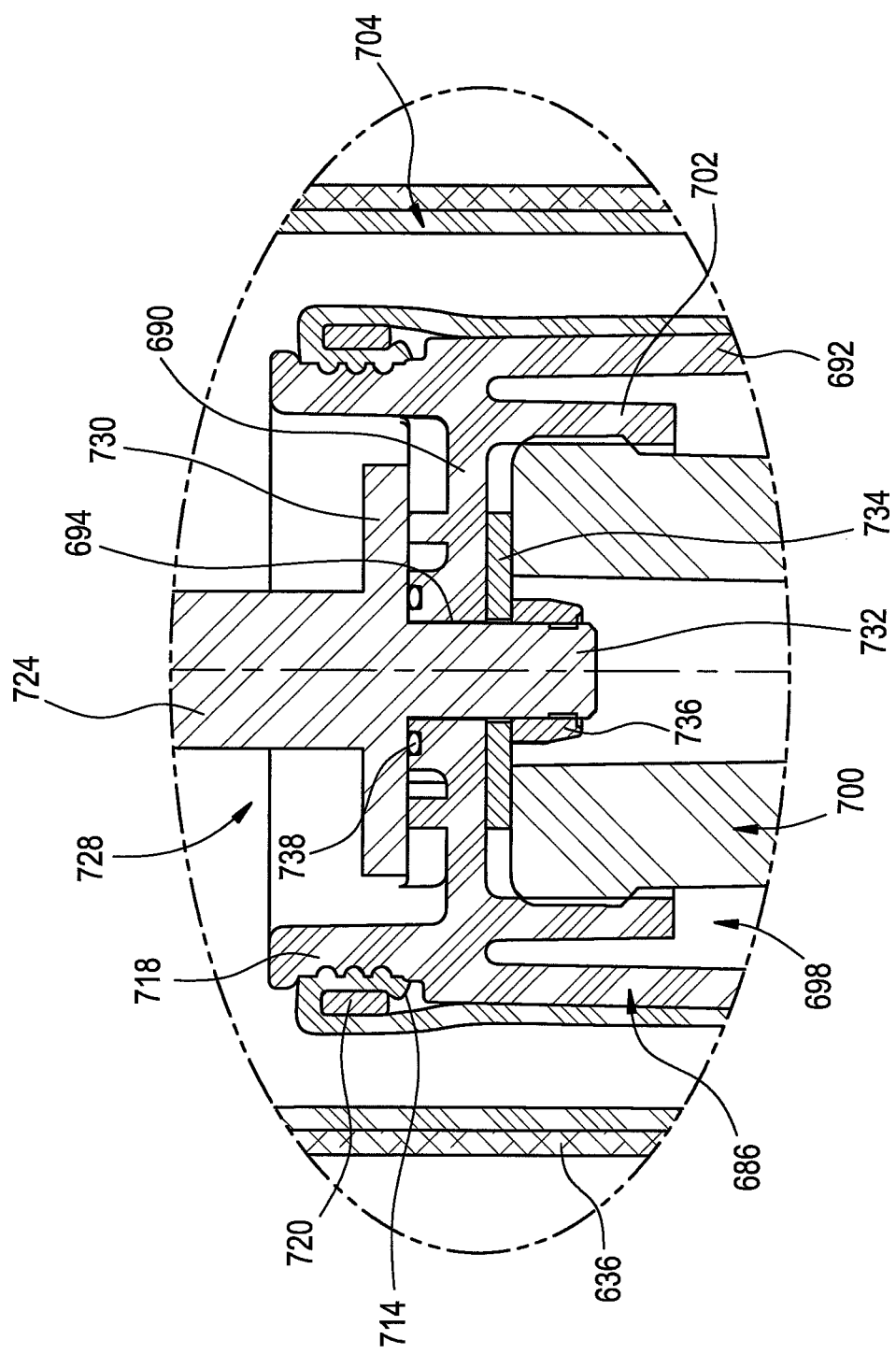
FIG. 13 is an enlarged view of the portion of the gas spring and gas damper assembly in FIGS. 10 and 11 identified as Detail 13 in FIG. 11.

Gas spring and gas damper assembly 600 also includes a flexible wall operatively connected between piston element 608 and piston element 686. The flexible wall is shown in FIGS. 11 and 13 as being an elongated flexible sleeve 704 that extends peripherally about axis AX and lengthwise between opposing ends 706 and 708. Flexible sleeve 704 can be secured between the end members (e.g., end element 606 and piston element 686) in a suitable manner such that a chamber 710 is at least partially defined thereby between end wall 634 and piston element 686. It will be recognized and appreciated that chamber 710 is in fluid communication with chamber 612 by way of one or more communication passages, such as communication passage 674, for example.

Flexible sleeve 704 can be operatively interconnected with components of the gas spring assembly and/or gas spring damper in any suitable manner. In some cases, one or both ends of the flexible sleeve can, optionally, include a mounting bead (not shown) or other connection feature, such as may include a reinforcing element (e.g., a bead wire) or other suitable component, for example. In other cases, the ends of the flexible sleeve can take the form of cut or severed ends along which the reinforcing cords of the flexible sleeve are exposed.

Sleeve ends 706 and 708 are shown in FIGS. 11 and 13 as terminating at outer edges 712 and 714, respectively, rather than having a mounting bead or other connection feature. Sleeve end 706 is disposed along an inside surface (not numbered) of outer side wall 636 of end element 608 and is secured thereto by way of a compressive interconnection between outer side wall 636 and a retaining ring 716. In some cases, outer side wall 636 may be crimped radially-inwardly or otherwise deformed to form a substantially fluid-tight seal between end element 608 and the sleeve end. In such cases, retaining ring 716 can function as an internal support element for the connection and against which the sleeve end can be compressed by the crimped outer side wall. It will be appreciated, however, that other arrangements and/or configurations could alternately be used.

Additionally, sleeve end 708 is secured along a suitable mounting feature or wall structure of piston element 686. As one example, piston element 686 can include a mounting wall 718 that extends axially from along end wall 690 in a direction opposite end 696. Sleeve end 708 can be secured along mounting wall 718 in any suitable manner, such as by way of a retaining ring 720 that is crimped radially-inwardly or otherwise deformed to form a substantially fluid-tight seal between end element 686 and the sleeve end. In this manner, flexible sleeve 704 can form a rolling-lobe 722 between the outer surface of outer side wall 692 and the inner surface of outer side wall 636.

Rod assembly 688 extends longitudinally through gas spring and gas damper assembly 600 and can include a damper rod 724 that is substantially inextensible and extends longitudinally along axis AX and between opposing ends 726 and 728. Rod assembly 688 includes a flange 730 disposed along end 728 and a securement feature 732, such as a threaded recess or projection, for example, disposed along damper rod 724 axially outwardly of flange 730.

Piston element 686 can be secured on or along end 728 of damper rod 724 in any suitable manner. As one example, securement feature 732 can extend through the element passage formed by passage wall 694 such that end wall 690 can be positioned in abutting engagement with flange 730. A washer or mounting base 734 can, optionally, be received on or along securement feature 732 in abutting engagement with end wall 690. A securement device 736, such as a threaded bolt or a threaded nut, for example, can operatively engage securement feature 732 to retain the piston element and the optional base wall on end 728 of damper rod 724. In some cases, a sealing element 738, such as an endless, annular sealing ring, for example, can be disposed between flange 730 and end wall 690 such that a substantially fluid-tight seal can be formed therebetween. In the exemplary arrangement shown in FIGS. 11 and 13, piston element 686 includes an annular groove (not numbered) formed into end wall 690 that at least partially receives and retains sealing ring 738. It will be appreciated, however, that other arrangements could alternately be used.

Damper rod 724 extends axially from adjacent end 728 through the element passage (not numbered) that is at least partially defined by passage wall 694 of piston element 686. The damper rod further extends through damping chamber 710 and through the damper passage (not numbered) that is at least partially defined by damper passage wall 670 and/or bushing 676. Damper rod 724 still further extends through chamber 612 and through the damper passage (not numbered) that is at least partially defined by damper passage wall 622.

End 726 of damper rod 724 can be operatively interconnected on or along end element 606 in any suitable manner. In the exemplary arrangement shown in FIGS. 10 and 11, damper rod 724 can include a shoulder wall 740 and a plurality of threads (not numbered) that extend axially-outwardly beyond the shoulder wall. In some cases, end element 606 may be captured or otherwise maintained in axially-fixed relation to shoulder wall 740. Alternately, end element 606 can be slidably supported along damper rod 724. A mounting feature of any suitable type, kind and/or construction can be used to operatively interconnect end 726 of damper rod 724 and/or end element 606 to an associated mounting structure, such as upper structural component USC in FIG. 2, for example.

In the exemplary arrangement shown, a pivot nut 742 can include a nut body 744 and a pivot element 746 that is fixedly attached thereto. Nut body 744 can include a bottom surface 748 and an inside wall 750 that includes a plurality of threads (not numbered). In some cases, pivot nut 742 can be threadably secured along end 726 of the damper rod such that bottom surface 748 of the nut body abuttingly engages shoulder wall 740. It will be appreciated, however, that it is generally desirable for pivot mount 652 and pivot element 746 of pivot nut 742 to have axes that are disposed in approximate alignment with one another, such as from within approximately ½ degree to approximately 10 degrees of rotational alignment about axis AX, for example. As such, in other cases, pivot nut 742 can be threadably secured along end 726 of the damper rod and oriented such that the pivot mount and pivot element are in approximate alignment with one another. Once in such an orientation, pivot nut 742 can be rotationally affixed to end 726 of damper rod 724 in any suitable manner, such as by using thread locking compound and/or a cross-drilled and pinned arrangement, for example.

Additionally, gas spring damper 604 can include one or more sealing elements operatively disposed between the damper rod and one or more end elements (e.g., end element 606) and/or piston elements (e.g., piston elements 608 and 686). In the exemplary arrangement shown, a sealing element 752 is operatively disposed between damper rod 724 and damper passage wall 622. As such, a substantially fluid-tight seal can be formed between the damper rod and end element 606. It will be appreciated that any suitable arrangement or configuration can be used for mounting and retaining the one or more sealing elements on or along the damper rod. For example, an endless annular groove (not numbered) can extend radially inwardly into the damper rod toward end 726.

Flexible walls 610 and 704 respectively form rolling lobes 754 and 722 along the outer side walls of piston elements 608 and 686. It will be recognized that a wide variety of shapes, profiles and/or configurations can and have been used in forming the outer side wall of piston elements, such as outer side wall 636 of piston element 608 and outer side wall 692 of piston element 686. As such, it will be appreciated that the outer side walls thereof can be of any suitable shape, profile and/or configuration and that the profiles shown in FIGS. 11 and 13 are merely exemplary.

Additionally, it will be appreciated that the end element (e.g., end element 606) and the piston elements (e.g., piston elements 608 and 686) can be formed from the suitable material or combination of materials. As examples, piston element 608 can be formed from a metal, such as steel or aluminum, for example. As further examples, end element 606 and/or piston element 686 can be formed from a polymeric material, such as a reinforced or unreinforced polyamide, for example.

Gas damper assembly 604 is shown in FIGS. 10 and 11 as being substantially entirely contained within gas spring assembly 602. As gas spring and gas damper assembly undergoes extension and compression during normal use in operation, end element 606 and piston element 686 will move together relative to piston element 608. During extension, pressurized gas from chamber 710 will be urged through passage 674 of end wall 634 and into chamber 612. During compression, pressurized gas from chamber portion 612 will be urged through one or more of passages 674 and into chamber portion 710. In a preferred arrangement, passages 674 will be configured to result in the dissipation of kinetic energy acting on the gas spring and gas damper assembly. As such, it will be appreciated that any suitable number of passages of any suitable size, shape and/or configuration can be used. Additionally, one or more valves or other fluid flow control devices (not shown) can, optionally, be included on or along end wall 634 or otherwise in fluid communication with one or more of passages 674.

As discussed above, piston elements 608 and 686 move relative to one another during use in operation. As such, bumper 700 or other cushioning elements can optionally be disposed on or along end wall 690 of piston element 686 and/or end wall 642 of piston element 608 to prevent or at least minimize the possibility of direct physical contact between the components. Additionally, gas spring and gas damper assembly 600 can optionally include any number or one or more additional element, features and/or components. For example, a distance sensing device can be operatively connected on or along one of the components of the gas spring assembly or the gas damper assembly.

Figure 14:
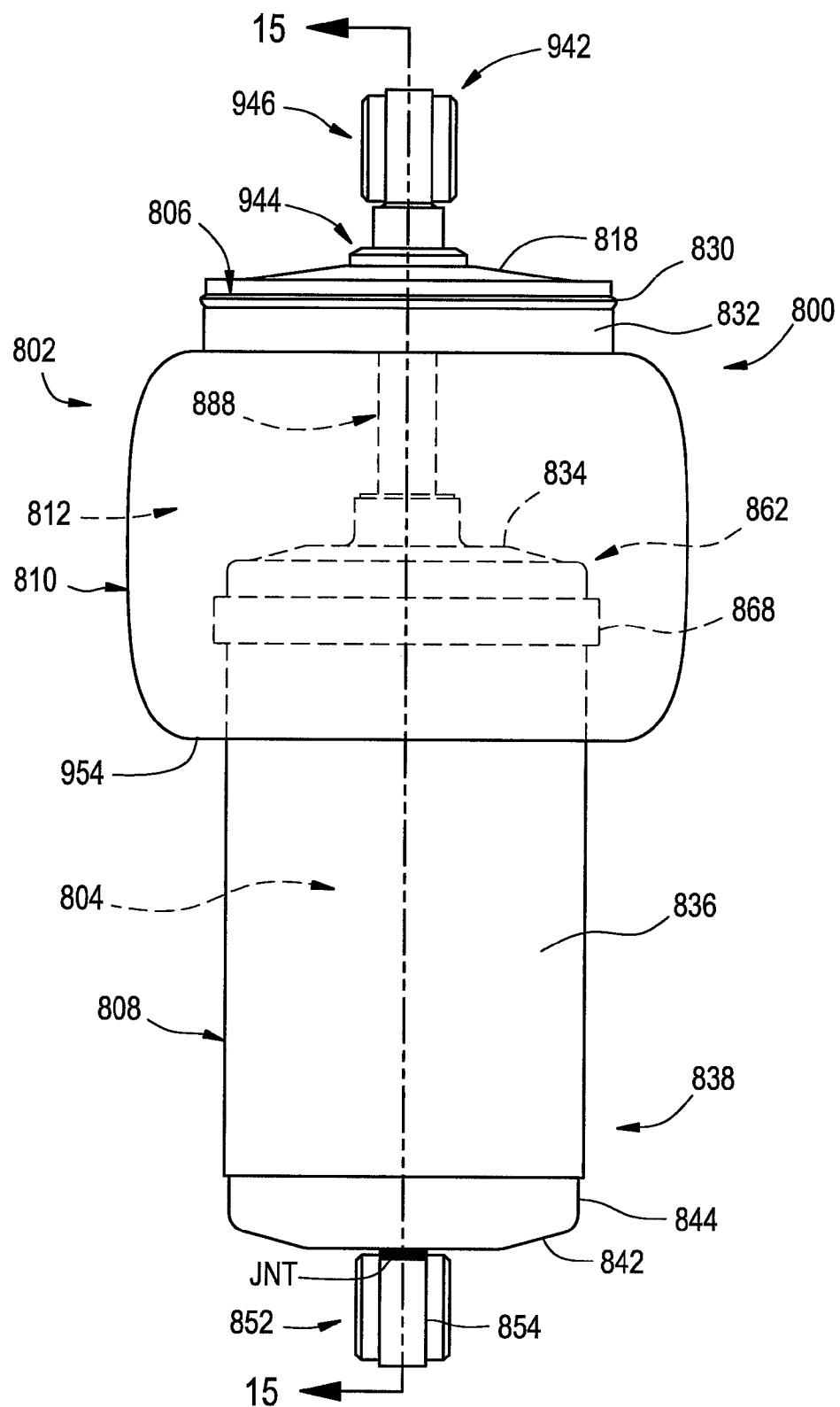
FIG. 14 is a side view of still another example of a gas spring and gas damper assembly in accordance with the subject matter of the present disclosure.
Figure 15:
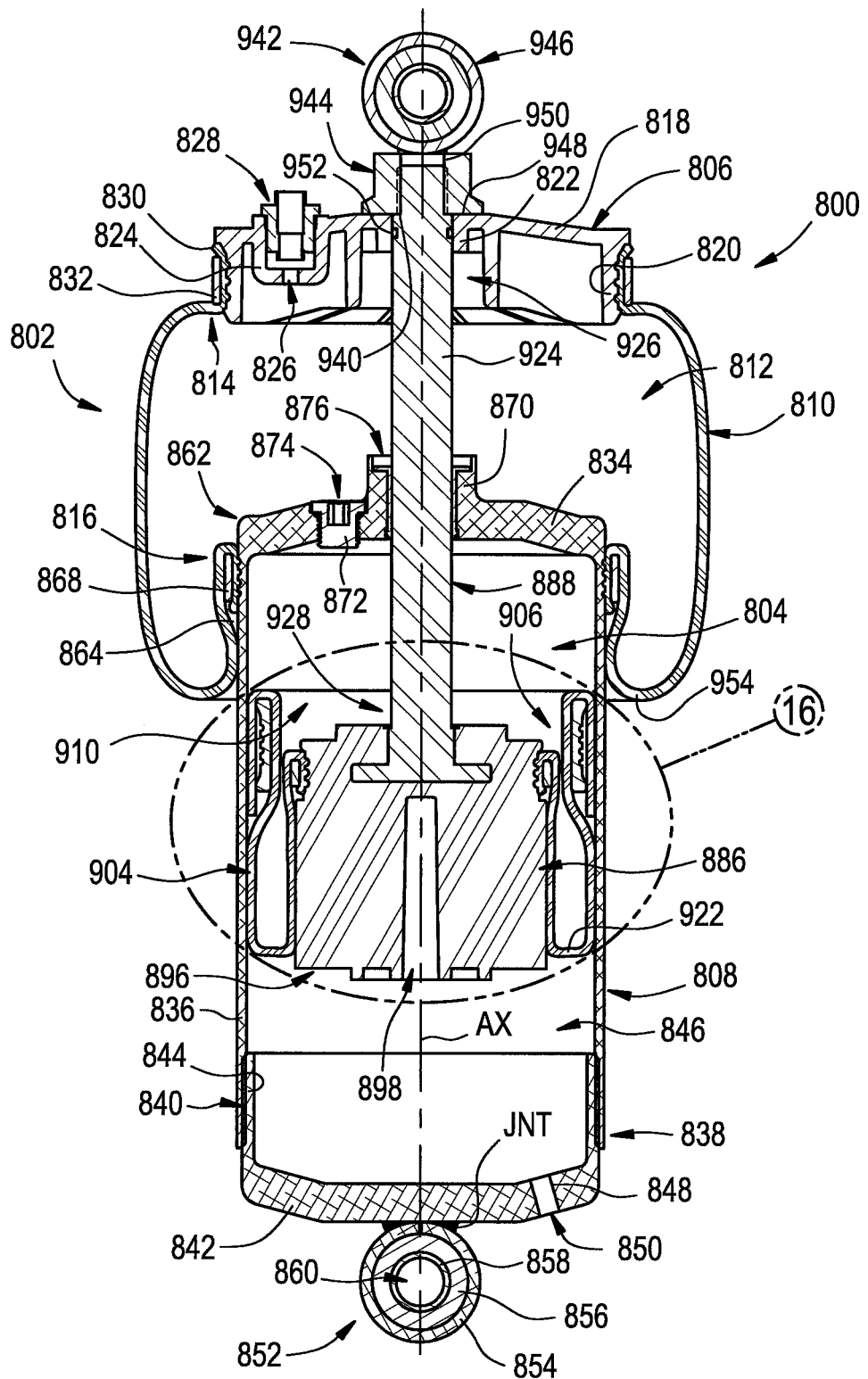
FIG. 15 is a cross-sectional side view of the gas spring and gas damper assembly in FIG. 14 taken from along line 15-15 thereof.
Figure 16:
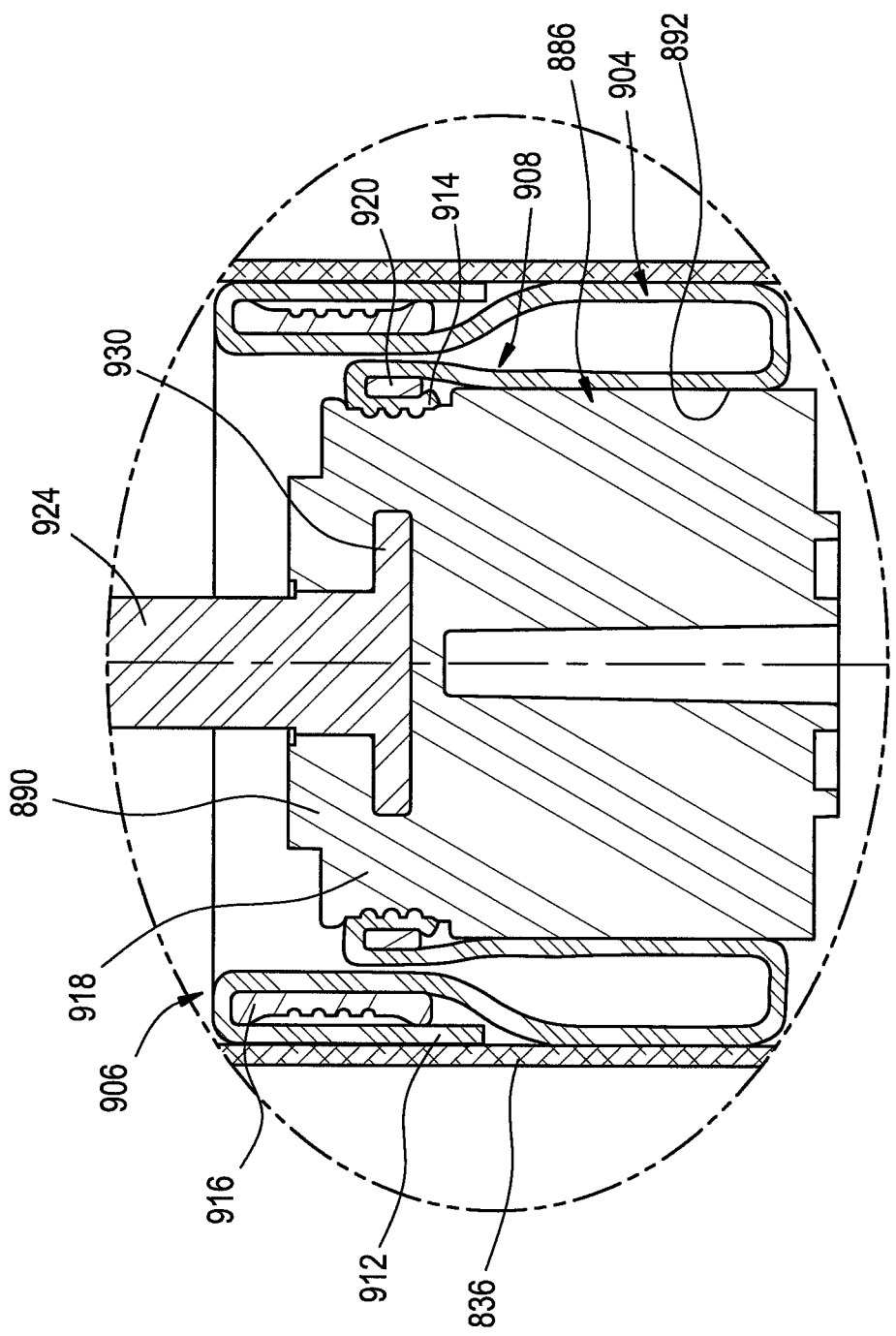
FIG. 16 is an enlarged view of the portion of the gas spring and gas damper assembly in FIGS. 14 and 15 identified as Detail 16 in FIG. 15.

Another example of a gas spring and gas damper assembly 800 in accordance with the subject matter of the present disclosure, such as may be used as gas spring and gas damper assembly 110 in FIG. 1, for example, is shown in FIGS. 14-16. Gas spring and gas damper assembly 800 includes a gas spring assembly 802 and a gas damper assembly 804 that is substantially-entirely housed within the gas spring assembly. Gas spring assembly 802 can be of any type, kind, construction, configuration and/or arrangement, and is shown in FIGS. 14-16 as being of a rolling lobe-type construction that has a longitudinal axis and includes a first end member, an opposing second end member spaced longitudinally from the first end member and a flexible wall that is operatively connected therebetween.

Gas spring and gas damper assembly 800 can be operatively connected between opposing structural components in any suitable manner, such as, for example, are generally represented in FIG. 2 by upper structural component USC (e.g., vehicle body 102 in FIG. 1) and lower structural component LSC (e.g., axle 104 in FIG. 1).

In the exemplary arrangement shown in FIGS. 14-16, gas spring assembly 802 has a longitudinally-extending axis AX and includes an end member (which may also be referred to herein as an "end element"), such as an end element or end cap 806, for example, and an opposing end member (which may also be referred to herein as an "end element"), such as a piston element 808, for example, that is spaced longitudinally from the end member (e.g., end element 806). A flexible wall, such as an elongated flexible sleeve 810, for example, can be secured between the end members (e.g., end element 806 and piston element 808) in a suitable manner such that a chamber 812 is at least partially formed therebetween.

Flexible sleeve 810 extends in a generally longitudinal manner between a sleeve end 814 and a sleeve end 816. Flexible sleeve 810 can be operatively interconnected with components of the gas spring assembly and/or gas damper assembly in any suitable manner. In some cases, one or both ends of the flexible sleeve can, optionally, include a mounting bead (not shown) or other connection feature, such as may include a reinforcing element (e.g., a bead wire) or other suitable component, for example. In other cases, the ends of the flexible sleeve can take the form of cut ends along which the reinforcing cords of the flexible sleeve are exposed.

In the exemplary arrangement shown in FIGS. 14-16, end element 806 includes an end wall 818 that extends transverse to axis AX, an outer peripheral wall 820, and a damper passage wall 822 that at least partially defines a damper passage (not numbered) extending through end wall 818. A fitting passage wall 824 can also be provided that at least partially defines a fitting passage 826 that extends through the end wall and is dimensioned to receive a suitable connector fitting 828, such as may be used to operatively interconnect spring chamber 812 with pressurized gas system 112, for example. Sleeve end 814 terminates at an outer edge 830. Additionally, sleeve end 814 is shown in FIGS. 14-16 as being disposed along outer peripheral wall 820 of end cap 806 and secured thereto by way of a retaining ring 832 that is crimped radially-inwardly or otherwise deformed to form a substantially fluid-tight seal between end cap 806 and sleeve end 814.

Piston element 808 is shown in FIGS. 14-16 as including an end wall 834 that extends transverse to axis AX and an outer side wall 836 that extends axially from end wall 834 in a direction away from end cap 806 toward an open end (not numbered). Outer side wall 836 includes a distal end 838 disposed opposite end wall 834 that includes a securement feature 840, such as a plurality of threads, for example, along the open end. An end wall 842 is secured along the open end. End wall 842 can be secured on or along the outer side wall in any suitable manner. As one example, the end wall can include an outer side wall 844 that includes a corresponding securement feature, such as a plurality of complimentary threads (not numbered), for example, for operatively interengaging securement feature 840 of outer side wall 836.

Piston element 808 includes an inner chamber 846 that is at least partially defined by end wall 834, outer side wall 836 and end wall 842. Piston element 808 can include one or more passages that permit fluid communication between inner chamber 846 and an external atmosphere EXT. In the exemplary arrangement shown in FIG. 15, passage walls 848 extend through end wall 842 and at least partially define passages 850. It will be appreciated, however, that any other suitable arrangement of passage walls could alternately be used.

Piston element 808 can also include a pivot mount 852 projecting from end wall 842 in a direction opposite the end wall 834. Pivot mount 852 can be of any suitable configuration, construction and/or arrangement. In the arrangement shown in FIGS. 14-16, for example, an outer ring 854 is secured along end wall 842 in a suitable manner, such as by way of a flowed material joint (e.g., a weld joint) JNT, for example. Outer ring 854 includes a ring wall (not numbered) that extends in a lengthwise direction transverse to axis AX and at least partially defines a bearing passage (not numbered) for receiving a suitable pivot and/or bearing element. In the exemplary arrangement shown, an elastomeric bushing 856 having an inner sleeve 858 is received within the bearing passage and at least partially defines a mounting passage 860, as identified in FIG. 15. It will be recognized and appreciated, however, that other arrangements and/or configurations could alternately be used.

As shown in FIG. 15, sleeve end 816 of flexible sleeve 810 is disposed along a proximal end 862 of outer side wall 836 adjacent end wall 834. Sleeve end 816 terminates at an outer edge 864 and can be secured on or along proximal end 862 of the outer side wall in any suitable manner. As one example, sleeve end 816 can be disposed along outer side wall 836, such as in a position toward end wall 834, for example, and secured thereto by way of a retaining ring 868 that is crimped radially-inwardly or otherwise deformed to form a substantially fluid-tight seal between outer side wall 836 and sleeve end 816.

In the preferred arrangement shown in FIGS. 14-16, end wall 834 is integrally connected or otherwise non-removably attached to outer side wall 836. End wall 834 extends transverse to axis AX and includes a damper passage wall 870 that at least partially defines a damper passage (not numbered) extending through end wall 834. End wall 834 can also include one or more passages that permit the transfer of pressurized gas into and out of spring chamber 812. As one example, end wall 834 can include a passage wall 872 (FIG. 15) that at least partially defines a communication passage 874 (FIG. 15) that extends through end wall 834 and is dimensioned to permit the transfer of pressurized gas into and out of spring chamber 812. In some cases, passage wall 872 can take the form of a fitting that is removably secured on or along end wall 834, such as may be useful for permitting a given component part or assembly to provide different damping performance and/or characteristics by installing fittings having passages 874 of different sizes, shapes and/or configurations.

As shown in FIGS. 14-16, a bearing element, such as a bushing 876, for example, can, optionally, be disposed along damper passage wall 870 and/or otherwise within the damper passage formed thereby. If provided, such a bearing element can be retained on or along end wall 834 in any suitable manner. Bushing 876 is substantially similar to bushing 676 shown and described in detail above in connection with FIGS. 14-16. As such, the detailed description of bushing 676 is equally applicable to busing 876. Thus, a detailed discussion of bushing 876 is not repeated here.

Gas damper assembly 804 can include an end member (which may also be referred to herein as an "end element"), such as a piston element 886, for example, that is spaced longitudinally from an end member of the gas spring assembly (e.g., end cap 806). Additionally, a rod assembly 888 can operatively connect piston element 886 and end element 806, such as may be used to maintain a substantially fixed spacing therebetween during dynamic use and operation. Piston element 886 can include an end wall 890 that is disposed transverse to axis AX and an outer side wall 892 that extends axially from along end wall 890 in a direction toward end wall 842. Outer side wall 892 can at least partially define an end 896 of piston element 886. In some cases, piston element 886 can, optionally, include a cavity (not shown) dimensioned to receive a bumper (not shown). Alternately, piston element 886 can be formed from a material or combination of materials having properties and/or characteristics that may permit the piston element to act as a bumper or bump stop, at least under certain conditions of operation.

Gas spring and gas damper assembly 800 also includes a flexible wall operatively connected between piston element 808 and piston element 886. The flexible wall is shown in FIGS. 14-16 as being an elongated flexible sleeve 904 that extends peripherally about axis AX and lengthwise between opposing ends 906 and 908. Flexible sleeve 904 can be secured between the end members (e.g., end element 806 and piston element 886) in a suitable manner such that a chamber 910 is at least partially defined thereby between end wall 834 and piston element 886. It will be recognized and appreciated that chamber 910 is in fluid communication with chamber 812 by way of one or more communication passages, such as communication passage 874, for example.

Flexible sleeve 904 can be operatively interconnected with components of the gas spring assembly and/or gas spring damper in any suitable manner. In some cases, one or both ends of the flexible sleeve can, optionally, include a mounting bead (not shown) or other connection feature, such as may include a reinforcing element (e.g., a bead wire) or other suitable component, for example. In other cases, the ends of the flexible sleeve can take the form of cut or severed ends along which the reinforcing cords of the flexible sleeve are exposed.

Sleeve ends 906 and 908 are shown in FIGS. 15 and 16 as terminating at outer edges 912 and 914, respectively, rather than having a mounting bead or other connection feature. Sleeve end 906 is disposed along an inside surface (not numbered) of outer side wall 836 of end element 808 and is secured thereto by way of a compressive interconnection between outer side wall 836 and a retaining ring 916. In some cases, outer side wall 836 may be crimped radially-inwardly or otherwise deformed to form a substantially fluid-tight seal between end element 808 and the sleeve end. In such cases, retaining ring 916 can function as an internal support element for the connection and against which the sleeve end can be compressed by the crimped outer side wall. It will be appreciated, however, that other arrangements and/or configurations could alternately be used.

Additionally, sleeve end 908 is secured along a suitable mounting feature or wall structure of piston element 886. As one example, piston element 886 can include a mounting wall 918 that extends axially from along end wall 890 in a direction opposite end 896. Sleeve end 908 can be secured along mounting wall 918 in any suitable manner, such as by way of a retaining ring 920 that is crimped radially-inwardly or otherwise deformed to form a substantially fluid-tight seal between end element 886 and the sleeve end. In this manner, flexible sleeve 904 can form a rolling-lobe 922 between the outer surface of outer side wall 892 and the inner surface of outer side wall 836.

Rod assembly 888 extends longitudinally through gas spring and gas damper assembly 800 and can include a damper rod 924 that is substantially inextensible and extends longitudinally along axis AX and between opposing ends 926 and 928. Rod assembly 888 includes a flange 930 disposed along end 928. Piston element 886 can be secured on or along end 928 of damper rod 924 in any suitable manner. As one example, piston element 886 can be molded over or otherwise formed around flange 930 of rod assembly 888. In such case, sealing elements and securement features, such as have been described above in connection with FIGS. 10-13, can be omitted. It will be appreciated, however, that other arrangements could alternately be used.

Damper rod 924 extends axially from adjacent end 928 out of piston element 886 and through damping chamber 910 as well as through the damper passage (not numbered) that is at least partially defined by damper passage wall 890 and/or bushing 896. Damper rod 924 still further extends through chamber 812 and through the damper passage (not numbered) that is at least partially defined by damper passage wall 822.

End 926 of damper rod 924 can be operatively interconnected on or along end element 806 in any suitable manner. In the exemplary arrangement shown in FIGS. 14-16, damper rod 924 can include a shoulder wall 940 and a plurality of threads (not numbered) that extend axially-outwardly beyond the shoulder wall. In some cases, end element 806 may be captured or otherwise maintained in axially-fixed relation to shoulder wall 940. Alternately, end element 806 can be slidably supported along damper rod 924. A mounting feature of any suitable type, kind and/or construction can be used to operatively interconnect end 926 of damper rod 924 and/or end element 806 to an associated mounting structure, such as upper structural component USC in FIG. 2, for example.

In the exemplary arrangement shown, a pivot nut 942 can include a nut body 944 and a pivot element 946 that is fixedly attached thereto. Nut body 944 can include a bottom surface 948 and an inside wall 950 that includes a plurality of threads (not numbered). In some cases, pivot nut 942 can be threadably secured along end 926 of the damper rod such that bottom surface 948 of the nut body abuttingly engages shoulder wall 940. It will be appreciated, however, that it is generally desirable for pivot mount 852 and pivot element 946 of pivot nut 942 to have axes that are disposed in approximate alignment with one another, such as from within approximately ½ degree to approximately 10 degrees of rotational alignment about axis AX, for example. As such, in other cases, pivot nut 942 can be threadably secured along end 926 of the damper rod and oriented such that the pivot mount and pivot element are in approximate alignment with one another. Once in such an orientation, pivot nut 942 can be rotationally affixed to end 926 of damper rod 924 in any suitable manner, such as by using thread locking compound and/or a cross-drilled and pinned arrangement, for example.

Additionally, gas spring damper 804 can include one or more sealing elements operatively disposed between the damper rod and one or more end elements (e.g., end element 806) and/or piston elements (e.g., piston elements 808 and 886). In the exemplary arrangement shown, a sealing element 952 is operatively disposed between damper rod 924 and damper passage wall 822. As such, a substantially fluid-tight seal can be formed between the damper rod and end element 806. It will be appreciated that any suitable arrangement or configuration can be used for mounting and retaining the one or more sealing elements on or along the damper rod. For example, an endless annular groove (not numbered) can extend radially inwardly into the damper rod toward end 926.

Flexible walls 810 and 904 respectively form rolling lobes 954 and 956 along the outer side walls of piston elements 808 and 886. It will be recognized that a wide variety of shapes, profiles and/or configurations can and have been used in forming the outer side wall of piston elements, such as outer side wall 836 of piston element 808 and outer side wall 892 of piston element 886. As such, it will be appreciated that the outer side walls thereof can be of any suitable shape, profile and/or configuration and that the profiles shown in FIGS. 14-16 are merely exemplary.

Additionally, it will be appreciated that the end element (e.g., end element 806) and the piston elements (e.g., piston elements 808 and 886) can be formed from the suitable material or combination of materials. As examples, piston element 808 can be formed from a metal, such as steel or aluminum, for example. As further examples, end element 806 and/or piston element 886 can be formed from a polymeric material, such as a reinforced or unreinforced polyamide, for example.

Gas damper assembly 804 is shown in FIGS. 14-16 as being substantially entirely contained within gas spring assembly 802. As gas spring and gas damper assembly undergoes extension and compression during normal use in operation, end element 806 and piston element 886 will move together relative to piston element 808. During extension, pressurized gas from chamber 910 will be urged through passage 874 of end wall 834 and into chamber 812. During compression, pressurized gas from chamber portion 812 will be urged through one or more of passages 874 and into chamber portion 910. In a preferred arrangement, passages 874 will be configured to result in the dissipation of kinetic energy acting on the gas spring and gas damper assembly. As such, it will be appreciated that any suitable number of passages of any suitable size, shape and/or configuration can be used. Additionally, one or more valves or other fluid flow control devices (not shown) can, optionally, be included on or along end wall 834 or otherwise in fluid communication with one or more of passages 874.

As discussed above, piston elements 808 and 886 move relative to one another during use in operation. As such, bumper 900 or other cushioning elements can optionally be disposed on or along end wall 890 of piston element 886 and/or end wall 842 of piston element 808 to prevent or at least minimize the possibility of direct physical contact between the components. Additionally, gas spring and gas damper assembly 800 can optionally include any number or one or more additional element, features and/or components. For example, a distance sensing device can be operatively connected on or along one of the components of the gas spring assembly or the gas damper assembly.

Figure 17:
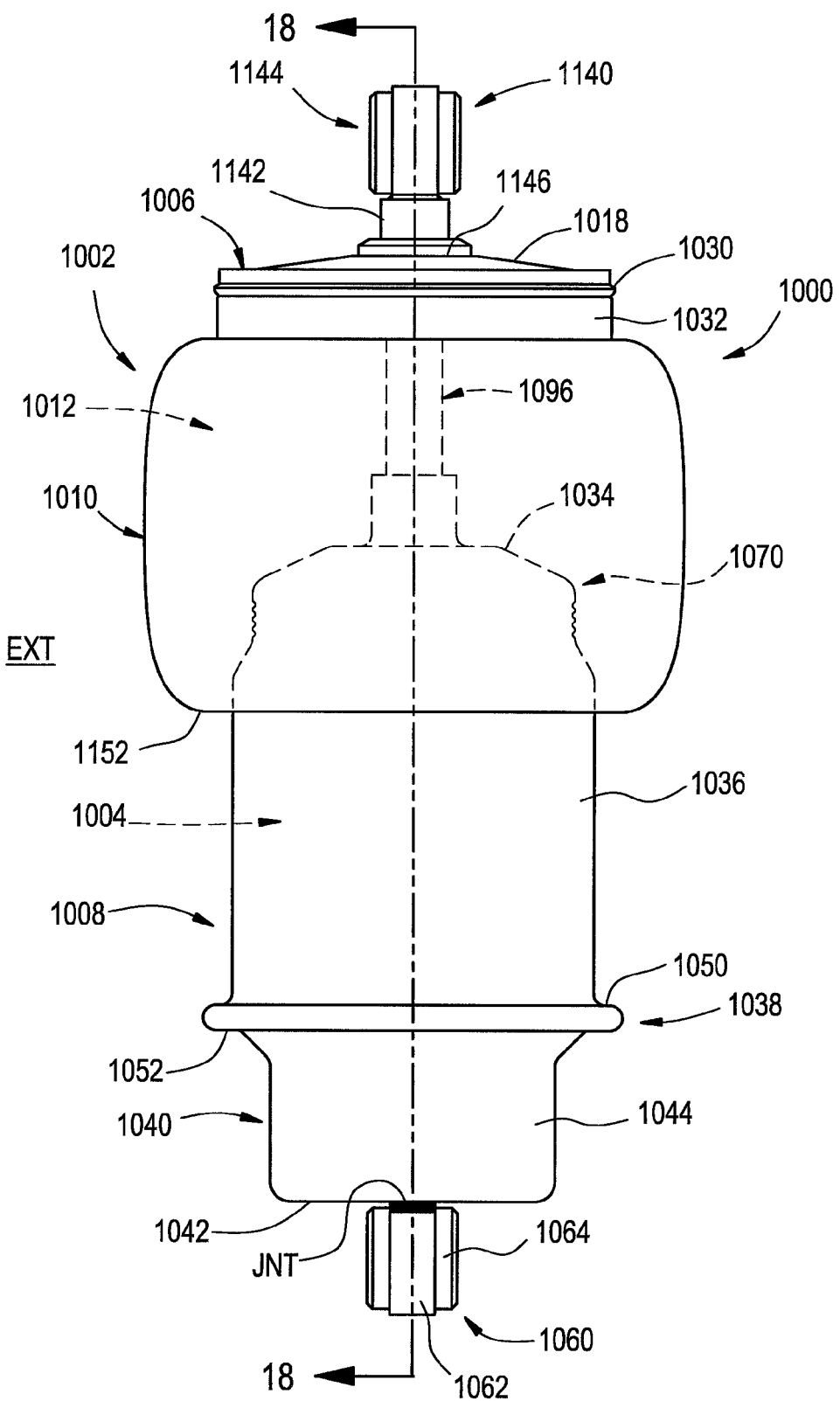
FIG. 17 is a side view of a further example of a gas spring and gas damper assembly in accordance with the subject matter of the present disclosure.
Figure 18:
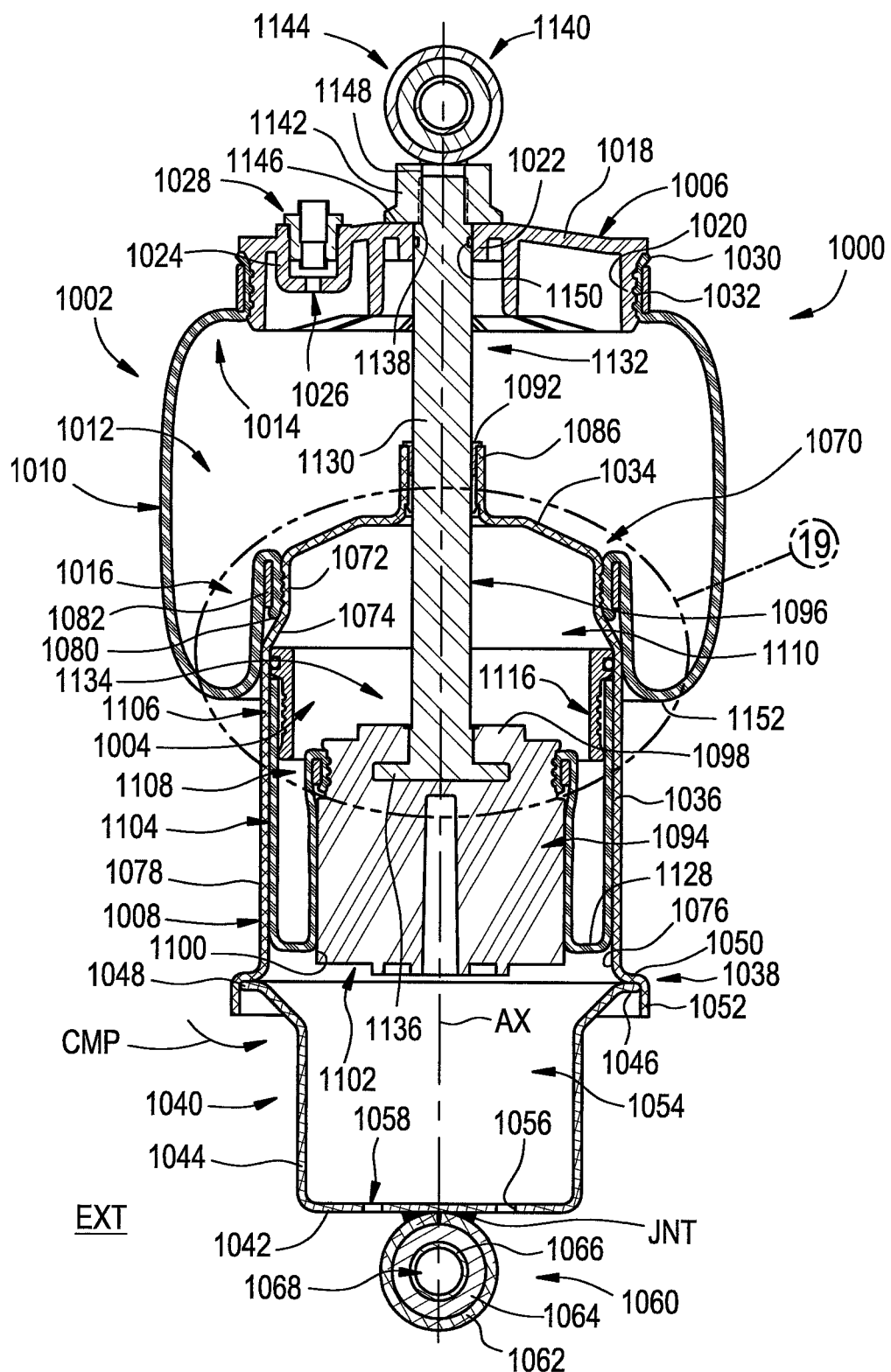
FIG. 18 is a cross-sectional side view of the gas spring and gas damper assembly in FIG. 17 taken from along line 18-18 thereof.
Figure 19:
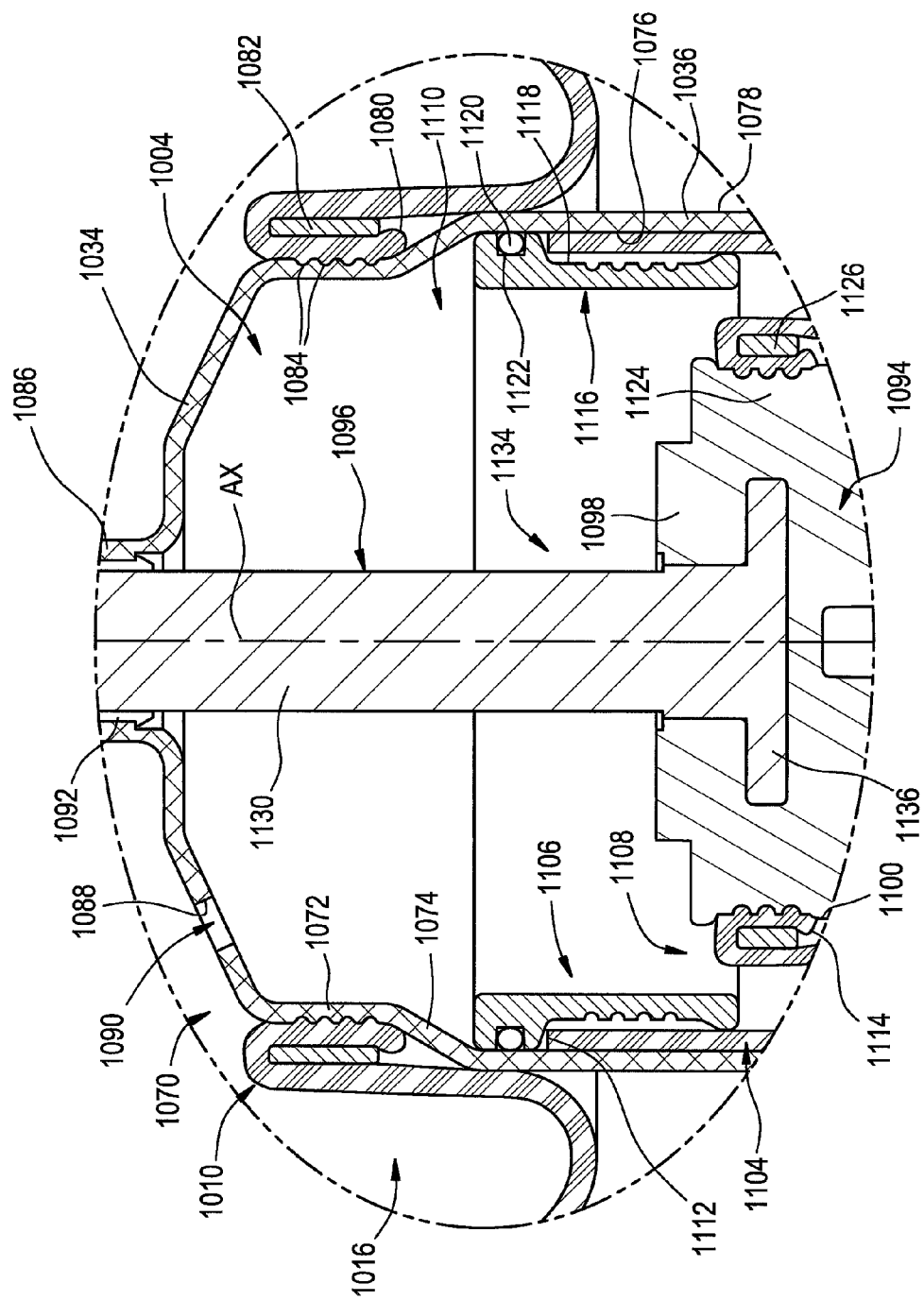
FIG. 19 is an enlarged view of the portion of the gas spring and gas damper assembly in FIGS. 17 and 18 identified as Detail 19 in FIG. 18.

Yet another example of a gas spring and gas damper assembly 1000 in accordance with the subject matter of the present disclosure, such as may be used as one or more of gas spring and gas damper assemblies 110 in FIG. 1, for example, is shown in FIGS. 17-19. Gas spring and gas damper assembly 1000 includes a gas spring assembly 1002 and a gas damper assembly 1004 that is substantially-entirely housed within the gas spring assembly. Gas spring assembly 1002 can be of any type, kind, construction, configuration and/or arrangement, and is shown in FIGS. 17-19 as being of a rolling lobe-type construction that has a longitudinal axis and includes a first end member, an opposing second end member spaced longitudinally from the first end member and a flexible wall that is operatively connected therebetween.

Gas spring and gas damper assembly 1000 can be operatively connected between opposing structural components in any suitable manner, such as, for example, are generally represented in FIG. 2 by upper structural component USC (e.g., vehicle body 102 in FIG. 1) and lower structural component LSC (e.g., axle 104 in FIG. 1).

In the exemplary arrangement shown in FIGS. 17-19, gas spring assembly 1002 has a longitudinally-extending axis AX and includes an end member 1006 (which may also be referred to herein as an "end element"), such as an bead plate or end cap, for example, and an opposing end member 1008 (which may also be referred to herein as an "end element"), such as a piston element, for example, that is spaced longitudinally from the end member (e.g., end element 1006). A flexible wall, such as an elongated flexible sleeve 1010, for example, can be secured between the end members (e.g., end element 1006 and end element 1008) in a suitable manner such that a chamber 1012 is at least partially formed therebetween. Generally, the flexible wall will be secured between one or more walls or wall portions of end members 1006 and 1008, such as will be described hereinafter.

Flexible sleeve 1010 extends in a generally longitudinal manner between a sleeve end 1014 and a sleeve end 1016. Flexible sleeve 1010 can be operatively interconnected with components of the gas spring assembly and/or gas damper assembly in any suitable manner. In some cases, one or both ends of the flexible sleeve can, optionally, include a mounting bead (not shown) or other connection feature, such as may include a reinforcing element (e.g., a bead wire) or other suitable component, for example. In other cases, the ends of the flexible sleeve can take the form of cut ends along which the reinforcing cords of the flexible sleeve are exposed.

In the exemplary arrangement shown in FIGS. 17-19, end element 1006 includes an end wall 1018 that extends transverse to axis AX, an outer peripheral wall 1020, and a damper passage wall 1022 that at least partially defines a damper passage (not numbered) extending through end wall 1018. A fitting passage wall 1024 can also be provided that at least partially defines a fitting passage 1026 that extends through the end wall and is dimensioned to receive a suitable connector fitting 1028, such as may be used to operatively interconnect spring chamber 1012 with pressurized gas system 112 in FIG. 1, for example. Sleeve end 1014 terminates at an outer edge 1030. Additionally, sleeve end 1014 is shown in FIGS. 17-19 as being disposed along at least a portion of outer peripheral wall 1020 of end element 1006 and secured thereto by way of a retaining ring 1032 that is crimped radially-inwardly or otherwise deformed to form a substantially fluid-tight seal between end element 1006 and sleeve end 1014.

End element 1008 is shown in FIGS. 17-19 as including an end wall 1034 that extends transverse to axis AX and an outer side wall 1036 that extends axially from end wall 1034 in a direction away from end element 1006 toward an open end (not numbered). Outer side wall 1036 includes a distal end 1038 disposed opposite end wall 1034. An end cap 1040 can be secured along the open end of outer side wall 1036, and can include an end wall 1042 and an outer side wall 1044. It will be appreciated that end cap 1040 can be secured on or along outer side wall 1036 in any suitable manner. As one example, the outer side wall of the end cap and the outer side wall of the end element could include one or more helical threads (not shown) that are complimentary to each other such that a threaded connection could be formed therebetween. As another example, a flowed-material joint could be used.

As a further example, outer side wall 1044 of end cap 1040 can include a distal wall portion 1046 that is disposed opposite end wall 1042 and extends radially outwardly toward an outer peripheral edge 1048 to at least form a mounting flange (not numbered) of the end cap. Distal end 1038 of outer side wall 1036 can be expanded outwardly to form a shoulder or seat 1050 along the open end of the outer side wall. The mounting flange of end cap 1040 that is at least partially formed by distal wall portion 1046 can be received within the open end and positioned along seat 1050. It will be appreciated that distal wall portion 1046 can be attached or otherwise secured on or along distal end 1038 of outer side wall 1036 in any suitable manner. For example, a portion 1052 of outer side wall 1036 can be crimped or otherwise deformed at least partially around distal wall portion 1046 to capture the distal wall portion between portion 1052 and seat 1050, such as is represented in FIG. 18 by arrow CMP, for example.

End element 1008 includes an inner chamber 1054 that is at least partially defined by end wall 1034, outer side wall 1036, end wall 1042 and outer side wall 1044. End element 1008 can include one or more passages that permit fluid communication between inner chamber 1054 and an external atmosphere EXT. In the exemplary arrangement shown in FIG. 18, passage walls 1056 extend through end wall 1042 and at least partially define passages 1058. It will be appreciated, however, that any other suitable arrangement of passage walls could alternately be used.

Piston element 1008 can also include a pivot mount 1060 projecting from end wall 1042 in a direction opposite the end wall 1034. Pivot mount 1060 can be of any suitable configuration, construction and/or arrangement. In the arrangement shown in FIGS. 17-19, for example, an outer ring 1062 is secured along end wall 1042 in a suitable manner, such as by way of a flowed material joint (e.g., a weld joint) JNT, for example. Outer ring 1062 includes a ring wall (not numbered) that extends in a lengthwise direction transverse to axis AX and at least partially defines a bearing passage (not numbered) for receiving a suitable pivot and/or bearing element. In the exemplary arrangement shown, an elastomeric bushing 1064 having an inner sleeve 1066 is received within the bearing passage and at least partially defines a mounting passage 1068, as identified in FIG. 18. It will be recognized and appreciated, however, that other arrangements and/or configurations could alternately be used.

As shown in FIGS. 18 and 19, sleeve end 1016 of flexible sleeve 1010 can be disposed along a proximal end 1070 of outer side wall 1036 adjacent end wall 1034. It will be appreciated end wall 1034 and/or outer side wall 1036 can be of any suitable configuration and/or arrangement along proximal end 1070. In some cases, end wall 1034 can transition directly into outer side wall 1036 such that the end element has an approximately uniform cross-sectional dimension in the lengthwise direction. In other cases, end element 1008 can include an inner side wall 1072 having a reduced cross-sectional dimension from that of outer side wall 1036. In such case, end wall 1034 can transition to inner side wall 1072, and inner side wall 1072 can transition to outer side wall 1036, such as by way of a connector wall portion 1074, for example. It will be appreciated that, in some cases, connector wall portion 1074 can at least partially define a shoulder or seat (not numbered) formed along an inner surface 1076 or an outer surface 1078 of end element 1008.

Sleeve end 1016 terminates at an outer edge 1080 and can be secured on or along outer surface 1078 of end element 1008, such as along proximal end 1070 of the outer side wall, for example, in any suitable manner. In a preferred arrangement, sleeve end 1016 can be disposed along at least a portion of inner side wall 1072 adjacent a shoulder (not numbered) formed by connector wall portion 1074. Additionally, sleeve end 1016 can be secured on or along the inner side wall in any suitable manner, such as by way of a retaining ring 1082 that is crimped radially-inwardly or otherwise deformed to form a substantially fluid-tight seal between inner side wall 1072 and sleeve end 1016. In some cases, one or more sleeve engagement features, such as endless, annular grooves 1084, for example, can be formed or otherwise provided on or along the inner side wall, such as may be suitable for enhancing the effectiveness of the interengagement between sleeve end 1016 and inner side wall 1072.

In the preferred arrangement shown in FIGS. 17-19, end wall 1034 is integrally connected or otherwise non-removably attached to inner side wall 1072 and/or outer side wall 1036. End wall 1034 extends transverse to axis AX and includes a damper passage wall 1086 that at least partially defines a damper passage (not numbered) extending through end wall 1034. End wall 1034 can also include one or more passages that permit the transfer of pressurized gas into and out of spring chamber 1012. As one example, end wall 1034 can include a passage wall 1088 (FIG. 19) that at least partially defines a communication passage 1090 (FIG. 19) that extends through end wall 1034 and is dimensioned to permit the transfer of pressurized gas into and out of spring chamber 1012. In some cases, passage wall 1088 can take the form of a fitting that is removably secured on or along end wall 1034, such as may be useful for permitting a given component part or assembly to provide different damping performance and/or characteristics by installing fittings having passages 1090 of different sizes, shapes and/or configurations.

As shown in FIGS. 17-19, a bearing element, such as a bushing 1092, for example, can, optionally, be disposed along damper passage wall 1086 and/or otherwise within the damper passage formed thereby. If provided, such a bearing element can be retained on or along end wall 1034 in any suitable manner. Bushing 1092 can be substantially similar to bushing 676 shown and described in detail above in connection with FIGS. 10-13. As such, the detailed description of bushing 676 is equally applicable to busing 1092. Thus, a detailed discussion of bushing 1092 is not repeated here.

Gas damper assembly 1004 can include an end member (which may also be referred to herein as an "end element"), such as a piston element 1094, for example, that is spaced longitudinally from an end member of the gas spring assembly (e.g., end element 1006). Additionally, a rod assembly 1096 can operatively connect piston element 1094 and end element 1006, such as may be used to maintain a substantially fixed spacing therebetween during dynamic use and operation. Piston element 1094 can include an end wall 1098 that is disposed transverse to axis AX and an outer side wall 1100 that extends axially from along end wall 1098 in a direction toward end cap 1040. Outer side wall 1100 can at least partially define an end 1102 of piston element 1094. In some cases, piston element 1094 can, optionally, include a cavity (not shown) dimensioned to receive a bumper (not shown). Alternately, piston element 1094 can be formed from a material or combination of materials having properties and/or characteristics that may permit the piston element to act as a bumper or bump stop, at least under certain conditions of operation.

Gas spring and gas damper assembly 1000 also includes a flexible wall operatively connected between end element 1008 and piston element 1094. The flexible wall is shown in FIGS. 17-19 as being an elongated flexible sleeve 1104 that extends peripherally about axis AX and lengthwise between opposing ends 1106 and 1108. Flexible sleeve 1104 can be secured between the end members (e.g., end element 1008 and piston element 1094) in a suitable manner such that a chamber 1110 is at least partially defined thereby between end wall 1034 and piston element 1094. It will be recognized and appreciated that chamber 1110 is in fluid communication with chamber 1012 by way of one or more communication passages, such as communication passage 1090, for example.

Flexible sleeve 1104 can be operatively interconnected with components of the gas spring assembly and/or gas spring damper in any suitable manner. In some cases, one or both ends of the flexible sleeve can, optionally, include a mounting bead (not shown) or other connection feature, such as may include a reinforcing element (e.g., a bead wire) or other suitable component, for example. In other cases, the ends of the flexible sleeve can take the form of cut or severed ends along which the reinforcing cords of the flexible sleeve are exposed.

Sleeve ends 1106 and 1108 are shown in FIGS. 18 and 19 as terminating at outer edges 1112 and 1114, respectively, rather than having a mounting bead or other connection feature. Sleeve end 1106 is disposed along inside surface 1076 of outer side wall 1036 of end element 1008 and is secured thereto by way of a compressive interconnection between outer side wall 1036 and a retaining ring 1116. In a preferred arrangement, sleeve end 1106 can be at least partially disposed along inner surface 1076 adjacent a shoulder formed by connector wall portion 1074. In some cases, at least a portion of retaining ring 1116 can be disposed in abutting engagement with a shoulder formed by connector wall portion 1074. As a result, in a preferred arrangement, retaining ring 1116 will be secured along end element 1008 in axially spaced relation to crimp ring 1082. Additionally, in some cases, outer side wall 1036 may be crimped radially-inwardly or otherwise deformed to form a substantially fluid-tight seal between end element 1008 and the sleeve end. In such cases, retaining ring 1116 can function as an internal support element for the connection and against which the sleeve end can be compressed by the crimped outer side wall. It will be appreciated, however, that other arrangements and/or configurations could alternately be used.

In some cases, sleeve ends 1106 and/or 1108 can be connected in a configuration and/or arrangement in which the cut or severed ends of flexible sleeve 1104 are exposed to an external atmosphere and, thus, fluidically isolated from the pressurized gas within chambers 1012 and 1110. It will be appreciated that such configurations and/or arrangements can be achieved in any suitable manner, such as the arrangements shown and described in connection with flexible sleeves 210, 610, 704, 810, 904, and/or 1010. As one example of an alternate configuration, sleeve end 1106 is shown in FIGS. 18 and 19 as having outer edge 1112 disposed toward chamber 1110. Retaining ring 1116 can include an outer surface 1118 dimensioned for abutting engagement with outer side wall 1036 and/or sleeve end 1106 of flexible sleeve 1104. In this manner, the end of the flexible sleeve can be secured on or along the inner surface of outer side wall 1036, as discussed above. To assist in maintaining outer edge 1112 of sleeve end 1106 in fluidic isolation from chamber 1110, a sealing element 1120, such as an O-ring, for example, can be at least partially received within an annular groove 1122 extending inwardly into retaining ring 1116 from along outer surface 1118.

Additionally, sleeve end 1108 is secured along a suitable mounting feature or wall structure of piston element 1094. As one example, piston element 1094 can include a mounting wall 1124 that extends axially from along end wall 1098 in a direction opposite end 1102. Sleeve end 1108 can be secured along mounting wall 1124 in any suitable manner, such as by way of a retaining ring 1126 that is crimped radially-inwardly or otherwise deformed to form a substantially fluid-tight seal between end element 1094 and the sleeve end. In this manner, flexible sleeve 1104 can form a rolling-lobe 1128 between the outer surface (not numbered) of outer side wall 1100 and inner surface 1076 of outer side wall 1036.

Rod assembly 1096 extends longitudinally through gas spring and gas damper assembly 1000 and can include a damper rod 1130 that is substantially inextensible and extends longitudinally along axis AX and between opposing ends 1132 and 1134. Rod assembly 1096 includes a flange 1136 disposed along end 1134. Piston element 1094 can be secured on or along end 1134 of damper rod 1130 in any suitable manner. As one example, piston element 1094 can be molded over or otherwise formed around flange 1136 of rod assembly 1096. In such case, sealing elements and securement features, such as have been described above in connection with FIGS. 10-13, can be omitted. It will be appreciated, however, that other arrangements could alternately be used.

Damper rod 1130 extends axially from adjacent end 1134 out of piston element 1094 and through damping chamber 1110 as well as through the damper passage (not numbered) that is at least partially defined by damper passage wall 1086 and/or bushing 1092. Damper rod 1130 still further extends through chamber 1012 and through the damper passage (not numbered) that is at least partially defined by damper passage wall 1022.

End 1132 of damper rod 1130 can be operatively interconnected on or along end element 1006 in any suitable manner. In the exemplary arrangement shown in FIGS. 17-19, damper rod 1130 can include a shoulder wall 1138 and a plurality of threads (not numbered) that extend axially-outwardly beyond the shoulder wall. In some cases, end element 1006 may be captured or otherwise maintained in axially-fixed relation to shoulder wall 1138. Alternately, end element 1006 can be slidably supported along damper rod 1130. A mounting feature of any suitable type, kind and/or construction can be used to operatively interconnect end 1132 of damper rod 1130 and/or end element 1006 to an associated mounting structure, such as upper structural component USC in FIG. 2, for example.

In the exemplary arrangement shown, a pivot nut 1140 can include a nut body 1142 and a pivot element 1144 that is fixedly attached thereto. Nut body 1142 can include a bottom surface 1146 and an inside wall 1148 that includes a plurality of threads (not numbered). In some cases, pivot nut 1140 can be threadably secured along end 1132 of the damper rod such that bottom surface 1146 of the nut body abuttingly engages shoulder wall 1138. It will be appreciated, however, that it is generally desirable for pivot mount 1060 and pivot element 1144 of pivot nut 1140 to have axes that are disposed in approximate alignment with one another, such as from within approximately ½ degree to approximately 10 degrees of rotational alignment about axis AX, for example. As such, in other cases, pivot nut 1140 can be threadably secured along end 1132 of the damper rod and oriented such that the pivot mount and pivot element are in approximate alignment with one another. Once in such an orientation, pivot nut 1140 can be rotationally affixed to end 1132 of damper rod 1130 in any suitable manner, such as by using thread locking compound and/or a cross-drilled and pinned arrangement, for example.

Additionally, gas spring damper 1004 can include one or more sealing elements operatively disposed between the damper rod and one or more end elements (e.g., end element 1006) and/or piston elements (e.g., piston elements 1008 and 1086). In the exemplary arrangement shown, a sealing element 1150 is operatively disposed between damper rod 1130 and damper passage wall 1022. As such, a substantially fluid-tight seal can be formed between the damper rod and end element 1006. It will be appreciated that any suitable arrangement or configuration can be used for mounting and retaining the one or more sealing elements on or along the damper rod. For example, an endless annular groove (not numbered) can extend radially inwardly into the damper rod toward end 1132.

Flexible walls 1010 and 1104 respectively form rolling lobes 1152 and 1128 along the outer side walls of piston elements 1008 and 1094. It will be recognized that a wide variety of shapes, profiles and/or configurations can and have been used in forming the outer side wall of piston elements, such as outer side wall 1036 of piston element 1008 and outer side wall 1100 of piston element 1094. As such, it will be appreciated that the outer side walls thereof can be of any suitable shape, profile and/or configuration and that the profiles shown in FIGS. 17-19 are merely exemplary.

Additionally, it will be appreciated that the end element (e.g., end element 1006) and the piston elements (e.g., piston elements 1008 and 1086) can be formed from the suitable material or combination of materials. As examples, piston element 1008 can be formed from a metal, such as steel or aluminum, for example. As further examples, end element 1006 and/or piston element 1094 can be formed from a polymeric material, such as a reinforced or unreinforced polyamide, for example.

Gas damper assembly 1004 is shown in FIGS. 17-19 as being substantially entirely contained within gas spring assembly 1002. As gas spring and gas damper assembly undergoes extension and compression during normal use in operation, end element 1006 and piston element 1094 will move together relative to piston element 1008. During extension, pressurized gas from chamber 1110 will be urged through passage 1090 of end wall 1034 and into chamber 1012. During compression, pressurized gas from chamber portion 1012 will be urged through one or more of passages 1090 and into chamber portion 1110. In a preferred arrangement, passages 1090 will be configured to result in the dissipation of kinetic energy acting on the gas spring and gas damper assembly. As such, it will be appreciated that any suitable number of passages of any suitable size, shape and/or configuration can be used. Additionally, one or more valves or other fluid flow control devices (not shown) can, optionally, be included on or along end wall 1034 or otherwise in fluid communication with one or more of passages 1090.

As discussed above, piston elements 1008 and 1094 move relative to one another during use in operation. As such, a bumper, such as one of bumpers 360 or 700, for example, or other cushioning elements can optionally be disposed on or along end wall 1098 of piston element 1094 and/or end wall 1042 of piston element 1008 to prevent or at least minimize the possibility of direct physical contact between the components. Additionally, gas spring and gas damper assembly 1000 can optionally include any number or one or more additional element, features and/or components. For example, a distance sensing device can be operatively connected on or along one of the components of the gas spring assembly or the gas damper assembly.

It will be appreciated that ends 232 and 303 of flexible wall 210, ends 630 and 664 of flexible wall 610, ends 712 and 714 of flexible wall 704, ends 830 and 864 of flexible wall 810, ends 912 and 914 of flexible wall 904, and ends 1030 and 1080 of flexible wall 1010 are all exposed to external atmosphere EXT. As such, these ends are fluidically isolated from the pressurized gas within the corresponding chambers formed by the respective flexible walls thereof. In this manner, a cut or otherwise unseal end of the flexible wall can be used in which the internal reinforcing cords are exposed along the ends.

Additionally, flexible walls 210, 610, 704, 810, 904, 1010 and 1104 can be of any suitable construction and/or configuration, and can be formed from any suitable material or combination of materials. In a preferred arrangement, however, flexible walls 610, 810 and/or 1010 can be formed from a conventional rubber construction in which two layers of substantially inextensible reinforcing cords are embedded within the flexible wall and disposed at opposing angles relative to one another. Flexible walls 704, 904, and/or 1104 can be formed from a rubber construction in which a single layer of substantially inextensible reinforcing cords are embedded within the flexible wall and are axially oriented and, thus, extend lengthwise along the flexible wall.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation.

Furthermore, the phrase "flowed-material joint" and the like are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, terms such as "gas," "pneumatic" and "fluid" as well as variants thereof, are used herein to broadly refer to and include any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment is specifically shown and described as including all such features and components. However, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations insofar as they come within the scope of the appended claims and any equivalents thereof.

The invention claimed is:

1. A gas spring and gas damper assembly comprising:
a first end member;
a second end member including a pivot mount;
a gas spring assembly including:
   a first wall portion of said first end member;
   a second wall portion of said second end member disposed in spaced relation to said first wall portion such that a longitudinal axis is formed therebetween; and,
   a first flexible wall section extending circumferentially about said axis and operatively connected between said first and second wall portions such that a first chamber is at least partially defined therebetween; and,
a gas damper assembly including:
   a third wall portion disposed in longitudinally-spaced relation to said first wall portion of said gas spring assembly, said third wall portion at least partially forms a roll-off piston;
   a second flexible wall section extending circumferentially about said axis and operatively connected between said second wall portion and said third wall portion such that a second chamber is at least partially defined therebetween;
   a fourth wall portion including opposing first and second sides, said fourth wall portion being an end element of said second end member and including first and second passages extending therethrough between said first and second sides, said fourth wall portion oriented such that said first side of said fourth wall portion is in fluid communication with said first chamber and said second side is in fluid communication with said second chamber; and,
   a damper rod extending through said first passage of said fourth wall portion and operatively connecting said first wall portion of said first end member to said third wall portion of said roll-off piston, said damper rod extending through said first end member and including a pivot mount positioned on an opposite side of said first end member from said first chamber;
   said roll-off piston being axially displaceable relative to said damper rod from a first position allowing relative rotational displacement between said damper rod and said roll-off piston and a second position restricting relative rotation between said damper rod and said roll-off piston.

2. A gas spring and gas damper assembly according to claim 1, wherein said first wall portion is a side wall portion of said first end member, said second wall portion is a side wall portion of said second end member, and said fourth wall portion is an end wall portion of said second end member that is operatively connected to said side wall portion of said second end member.

3. A gas spring and gas damper assembly according to claim 2, wherein said first flexible wall section forms a rolling lobe along an outer surface of said side wall portion of said second end member, and said second flexible wall section forms a rolling lobe between an inner surface of said side wall portion of said second end member and said roll-off piston.

4. A gas spring and gas damper assembly according to claim 1, wherein first and second flexible wall sections are portions of a single flexible wall.

5. A gas spring and gas damper assembly according to claim 1, wherein said first flexible wall section is at least partially formed from a flexible wall having first and second reinforcing plies disposed at opposing angles to one another, and said second the flexible wall section is at least partially formed from a flexible wall having a single reinforcing plies extending longitudinally along said flexible wall.

6. A gas spring and gas damper assembly according to claim 1, wherein said first and second flexible wall sections are secured along said second wall portion in axially spaced relation to one another.

7. A gas spring and gas damper assembly according to claim 1, wherein at least one end of at least one of said first and second flexible wall sections is secured using a retaining ring.

8. A gas spring and gas damper assembly according to claim 7, wherein said retaining ring includes an annular groove extending into said retaining ring and dimensioned to receive a sealing element operative to form a substantially fluid tight seal with one of said first wall portion, said second wall portion, said third wall portion and said fourth wall portion.

9. A gas spring and gas damper assembly according to claim 1, wherein one of said first flexible wall section and said second flexible wall section includes a cut end disposed in fluid communication with one of said first and second chambers, and said gas spring and gas damper assembly further comprises a sealing element operatively disposed between said cut end and said one of said first and second chambers such that said cut end is fluidically isolated from said one of said first and second chambers.

10. A gas spring and gas damper assembly according to claim 1, wherein said second wall portion includes a first wall section and a second wall section spaced radially inwardly from said first wall section with a connecting wall section extending their between, said first flexible wall section is secured along said second wall section of said second wall portion, and said second flexible wall section is secured along said first wall section of said second wall portion.

11. A method of assembling a gas spring and gas damper assembly, said method comprising:
providing a rod assembly including a longitudinal axis, an elongated rod, an end nut and a sealing element;
providing an inner piston element having a passage extending therethrough, and extending said elongated rod through said passage such that said end nut and said sealing element engage said inner piston element in a first position in which said end nut remains rotatably displaceable relative to said inner piston element and in which a substantially fluid-tight seal is formed between said sealing element and said inner piston element;
providing a flexible wall and securing said flexible wall to said inner piston element to at least partially form a spring chamber;
providing a first pivot mount operatively connected to said elongated rod at a position outside the spring chamber, and a second pivot end supported in spaced relation to the first pivot mount;
orienting said first and second pivot mounts relative to one another by rotating at least said first pivot mount, said elongated rod and said end nut relative to said inner piston element such that said pivot mounts are in approximate alignment with one another; and,
transferring pressurized gas into said spring chamber, and thereby urging said inner piston element in an axially-outward direction and into a second position in which said end nut and said inner piston element are rotatably fixed relative to one another.

12. A gas spring and gas damper assembly comprising:
a rod assembly, an elongated rod including a longitudinal axis, having opposing first and second ends, an end nut disposed along said first end and a sealing element disposed along said elongated rod between said first and second ends;
an inner piston element having a passage extending therethrough, said elongated rod extending through said passage and engaging said end nut and said sealing element in a first position with said inner piston element such that said end nut remains rotatably displaceable relative to said inner piston element and such that a substantially fluid-tight seal is formed between said sealing element and said inner piston element;
a first flexible wall section having a first end secured to said inner piston element;
an outer piston element including a side wall, an open end and a pivot mount opposite said open end;
said inner piston element and at least a portion of said first flexible wall section disposed within said outer piston element such that a first rolling lobe is formed between said inner and outer piston elements;
an inner end element including a passage, said inner end element positioned along said open end of said outer piston element such that said elongated rod of said rod assembly extends through said passage;
a second flexible wall section having a first end, said first and second flexible wall sections and said inner end element secured along said open end of said outer piston element such that a first spring chamber is at least partially formed by said first flexible wall section;
a second end element including a passage formed therethrough, said second end element positioned along said rod assembly such that said elongated rod extends through said passage, and said first end of said second flexible wall section secured to said second end element such that a second spring chamber is at least partially formed by said second flexible wall section, said second spring chamber being in fluid communication with said first spring chamber;
an end nut with a pivot mount formed thereon secured along said second end of said elongated rod;
wherein said pivot mount of said outer piston element and said pivot mount of said end nut are pivotable relative to one another when said inner piston is in said first position; and,
wherein said inner piston is movable to a second position in which said end nut is rotatably fixed relative to said inner piston element.

* * * * *